United States Patent
Alef et al.

(10) Patent No.: US 10,625,488 B2
(45) Date of Patent: Apr. 21, 2020

(54) CONTAINER PRECURSOR, IN PARTICULAR FOR THE MANUFACTURE OF A FOOD CONTAINER, FROM A LAMINATE WITH A PEELED EDGE REGION, WHICH IS PARTIALLY FOLDED BACK ON ITSELF

(71) Applicant: SIG Technology AG, Neuhausen (CH)

(72) Inventors: Ulrich Alef, Wegberg (DE); Thomas Schumacher, Aldenhoven (DE); Norbert Peter Herzog, Huckelhoven (DE)

(73) Assignee: SIG TECHNOLOGY AG, Neuhausen (CH)

( * ) Notice: Subject to any disclaimer, the term of this patent is extended or adjusted under 35 U.S.C. 154(b) by 221 days.

(21) Appl. No.: 15/523,327

(22) PCT Filed: Oct. 26, 2015

(86) PCT No.: PCT/EP2015/074769
§ 371 (c)(1),
(2) Date: Apr. 28, 2017

(87) PCT Pub. No.: WO2016/066592
PCT Pub. Date: May 6, 2016

(65) Prior Publication Data
US 2017/0239908 A1    Aug. 24, 2017

(30) Foreign Application Priority Data
Oct. 31, 2014   (DE) .................. 10 2014 015 961

(51) Int. Cl.
*B32B 3/04*    (2006.01)
*B32B 7/02*    (2019.01)
(Continued)

(52) U.S. Cl.
CPC ............... *B32B 3/04* (2013.01); *B29C 53/04* (2013.01); *B32B 1/02* (2013.01); *B32B 1/06* (2013.01);
(Continued)

(58) Field of Classification Search
CPC .... B32B 3/04; B32B 3/06; B32B 1/02; B32B 7/022; B32B 7/02; B32B 7/04;
(Continued)

(56) References Cited

U.S. PATENT DOCUMENTS 2,333,330 A    11/1943    Moore
2,440,339 A    4/1948    Langer
(Continued)

FOREIGN PATENT DOCUMENTS

BE    558784 A1    7/1957
CA    1175011 A1    9/1984
(Continued)

OTHER PUBLICATIONS

European Patent Office, International Search Report, dated Jan. 18, 2016.
(Continued)

*Primary Examiner* — Robert J Hicks
(74) *Attorney, Agent, or Firm* — Taft Stettinius & Hollister LLP

(57) ABSTRACT

The invention relates to a container precursor comprising a wall, wherein the wall a) surrounds an interior region, and b) comprises a first wall region and a second wall region. Further, the invention relates to a process for manufacturing a container precursor, a container precursor obtainable through this process, a closed container, a process for manufacturing a closed container, a closed container obtain-
(Continued)

able through this process, a use of the aforementioned container precursor, and a further use of the aforementioned container precursor.

23 Claims, 11 Drawing Sheets

(51) Int. Cl.
| | |
|---|---|
| B32B 15/08 | (2006.01) |
| B32B 15/12 | (2006.01) |
| B32B 15/20 | (2006.01) |
| B32B 1/02 | (2006.01) |
| B65D 5/42 | (2006.01) |
| B32B 7/04 | (2019.01) |
| B32B 3/06 | (2006.01) |
| B32B 1/06 | (2006.01) |
| B65D 5/06 | (2006.01) |
| B65D 5/56 | (2006.01) |
| B29C 53/04 | (2006.01) |
| B65B 7/16 | (2006.01) |
| B65B 43/10 | (2006.01) |
| B65B 55/04 | (2006.01) |
| B32B 15/085 | (2006.01) |
| B29L 31/00 | (2006.01) |

(52) U.S. Cl.
CPC .............. *B32B 3/06* (2013.01); *B32B 7/02* (2013.01); *B32B 7/04* (2013.01); *B32B 15/085* (2013.01); *B32B 15/12* (2013.01); *B32B 15/20* (2013.01); *B65B 7/16* (2013.01); *B65B 43/10* (2013.01); *B65B 55/04* (2013.01); *B65D 5/064* (2013.01); *B65D 5/4279* (2013.01); *B65D 5/563* (2013.01); *B29L 2031/7162* (2013.01); *B32B 2250/05* (2013.01); *B32B 2250/40* (2013.01); *B32B 2250/42* (2013.01); *B32B 2250/44* (2013.01); *B32B 2307/724* (2013.01); *B32B 2307/7242* (2013.01); *B32B 2307/7244* (2013.01); *B32B 2307/7246* (2013.01); *B32B 2439/40* (2013.01); *B32B 2439/62* (2013.01); *B32B 2439/70* (2013.01)

(58) Field of Classification Search
CPC ......... B32B 7/08; B32B 15/085; B32B 15/08; B32B 15/04; B32B 15/12; B32B 15/20; B29C 53/04; B65B 7/16; B65B 43/10; B65B 55/04; B65D 5/064; B65D 5/061; B65D 5/06; B65D 5/4279; B65D 5/563; B65D 5/56
USPC ....... 220/62.17, 62.15, 62.11, 680; 229/5.84, 229/5.81, 103.1; 428/41.1, 34.2, 328; 493/52, 395
See application file for complete search history.

(56) References Cited

U.S. PATENT DOCUMENTS

| | | | |
|---|---|---|---|
| 2,944,715 A | 7/1960 | Vergobbi | |
| 3,067,923 A | 12/1962 | Thiets | |
| 3,092,248 A | 6/1963 | Lane et al. | |
| 3,106,327 A | 10/1963 | Karl | |
| 3,197,112 A | 7/1965 | Meyer-Jagenberg | |
| 3,581,972 A * | 6/1971 | Buchner | B29C 63/0039 229/4.5 |
| 3,669,816 A * | 6/1972 | Smith et al. | B32B 27/00 428/61 |
| 3,846,220 A | 11/1974 | Buchner | |
| 4,017,486 A | 4/1977 | Buell et al. | |
| 4,048,935 A | 9/1977 | Beveridge et al. | |
| 4,239,150 A | 12/1980 | Schadowski et al. | |
| 4,471,864 A | 9/1984 | Kuchenbecker | |
| 4,546,911 A | 10/1985 | Clauss | |
| 4,558,814 A | 12/1985 | Ihde | |
| 4,589,591 A | 5/1986 | Sjostrand et al. | |
| 4,646,935 A * | 3/1987 | Ulam | A47J 36/02 219/621 |
| 4,684,553 A * | 8/1987 | Sasaki | B31C 3/00 206/524.6 |
| 4,692,132 A * | 9/1987 | Ikushima | B65D 3/22 220/619 |
| 4,802,620 A | 2/1989 | Phillips | |
| 5,385,527 A | 1/1995 | Fukada et al. | |
| 5,415,910 A * | 5/1995 | Knauf | B65D 3/22 206/803 |
| 5,622,308 A | 4/1997 | Ito et al. | |
| 5,810,243 A | 9/1998 | DiPinto | |
| 6,715,626 B2 * | 4/2004 | Balzer | B60K 15/03177 220/4.13 |
| 9,902,124 B2 | 2/2018 | Wolters et al. | |
| 2002/0166887 A1 | 11/2002 | Matsuoka | |
| 2003/0044552 A1 | 3/2003 | Komada | |
| 2004/0052987 A1 | 3/2004 | Shetty et al. | |
| 2005/0255261 A1 | 11/2005 | Nomula | |
| 2008/0041860 A1 | 2/2008 | Wiedmeyer et al. | |
| 2012/0104078 A1 | 5/2012 | Yan | |

FOREIGN PATENT DOCUMENTS

| | | |
|---|---|---|
| DE | 3023835 A1 | 1/1981 |
| DE | 9218601 U1 | 12/1994 |
| DE | 102011108401 A1 | 1/2013 |
| EP | 0049460 A1 | 4/1982 |
| EP | 0095153 A1 | 11/1983 |
| GB | 528547 A | 10/1940 |
| GB | 1078327 A | 8/1967 |
| JP | H04083637 A | 3/1992 |
| JP | H08244763 A | 9/1996 |
| JP | 2657830 B2 | 9/1997 |
| JP | 2000225655 A | 8/2000 |
| JP | 2003112719 A | 4/2003 |
| JP | 2003312636 A | 11/2003 |
| JP | 2004101412 A | 4/2004 |
| JP | 2006273396 A | 10/2006 |
| JP | 2007091323 A | 4/2007 |
| JP | 2008222246 A | 9/2008 |
| JP | 2013043684 A | 3/2013 |
| JP | 2013180793 A | 9/2013 |
| JP | 2014012545 A | 1/2014 |
| JP | 2014141282 A | 8/2014 |
| WO | 9208652 A1 | 5/1992 |
| WO | 2010109000 A2 | 9/2010 |
| WO | 2011088966 A1 | 7/2011 |
| WO | 2012064478 A1 | 5/2012 |
| WO | 2013048237 A1 | 4/2013 |

OTHER PUBLICATIONS

European Patent Office, Written Opinion of the International Searching Authority, dated Jan. 18, 2016.

Japanese Office Action; Japan Patent Office; Japanese Patent Application No. 2017-523353; dated Aug. 28, 2019; 14 pages.

* cited by examiner

102

102

600

700

900

1000

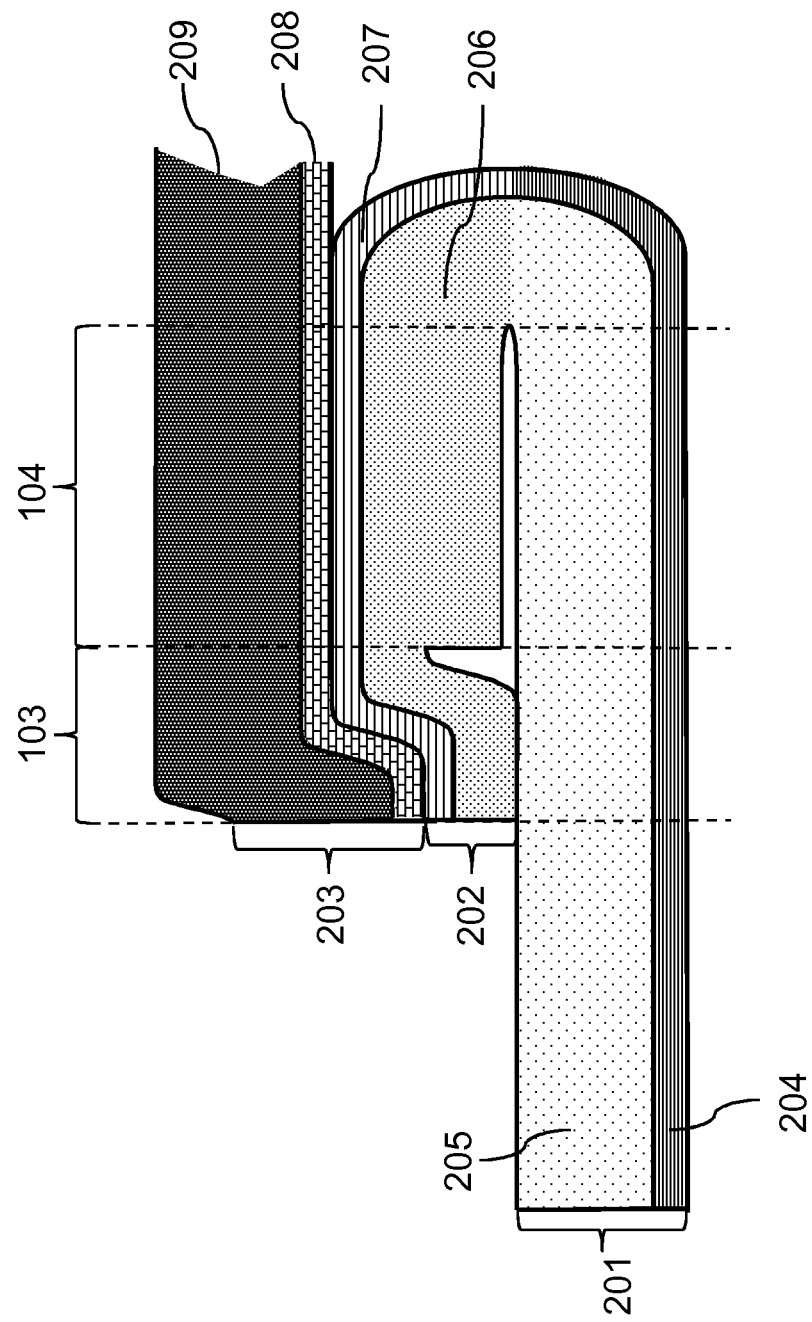

CONTAINER PRECURSOR, IN PARTICULAR FOR THE MANUFACTURE OF A FOOD CONTAINER, FROM A LAMINATE WITH A PEELED EDGE REGION, WHICH IS PARTIALLY FOLDED BACK ON ITSELF

CROSS-REFERENCE TO RELATED APPLICATIONS

The present application is a U.S. national stage of, and claims the priority benefit of, International Patent Application Serial No. PCT/EP2015/074769, filed Oct. 26, 2015 and also claims the priority benefit of German Patent Application Serial No. 10 2014 015 961.2, filed Oct. 31, 2014, the text and drawings of which are hereby incorporated by reference in their entireties.

The present invention relates to a precursor of a container, in particular for holding food, a process for manufacturing a container precursor, a container precursor obtainable by this process, a closed container, a process for manufacturing a closed container, a closed container obtainable by this process, a use of the abovementioned container precursor and a further use of the abovementioned container precursor.

For a long time, both food for human consumption and pet food products have been preserved in either a can or a glass jar closed with a lid. In such case, the storage life can be increased by sterilising the food and the container, in this case the glass jar or the can, separately, as far as possible and then filling the container with the food and closing it. These measures for increasing the storage life of food, which have been tried and tested over a long period of time, have a number of disadvantages, however; for example subsequent re-sterilisation is necessary. Because of their substantially cylindrical form, cans and glass jars have the disadvantage that very dense and space-saving storage is impossible. In addition, the weight of cans and glass jars themselves is considerable, which leads to increased energy consumption during transport. Energy consumption for the manufacture of glass, tin plate and aluminium is also very high, even if the raw materials used in the process come from recycling. In the case of glass jars, high transport costs also aggravate the situation. Glass jars are usually pre-manufactured in glass works and then have to be transported to the food bottling plant, necessitating considerable transport volumes. Furthermore, glass jars and cans can only be opened with a great deal of effort or with the aid of tools, which is, therefore, inconvenient. In the case of cans, there is a high risk of injury caused by sharp edges during opening. With glass jars, it happens again and again that splinters of glass get into the food when the glass jars are being filled or the full glass jars are being opened which, in the worst case, can lead to internal injuries when the food is consumed. In addition, both glass jars and cans must have labels affixed to them to identify and advertise the contents of the food. Information and advertisements cannot be printed directly on glass jars and cans. In addition to the actual printing, therefore, a substrate—a paper or a suitable film—as well as a fixing medium—an adhesive or sealant—are necessary.

Other packaging systems for storing food for a long period of time with as few adverse effects as possible are known from prior art. These are containers manufactured from sheet-like composites—frequently also referred to as laminates. Such sheet-like composites frequently consist of a thermoplastic plastic layer, a carrier layer consisting usually of cardboard or paperboard, an adhesion promoting layer, a barrier layer and a further layer of plastic, as disclosed, inter alia, in WO 90/09926 A2.

These laminate containers have many advantages over conventional glass jars and cans. Nevertheless, these packaging systems can still be improved upon.

Laminate containers are frequently characterised in that they consist of a laminate which has been folded several times, with opposite ends of the laminate being sealed one on top of the other to form, in the first instance, a shell- or tube-shaped precursor of a closed container. The end areas sealed one on top of the other form a longitudinal seam, which is also present in the closed container. Both on the inside and on the outside of the container this longitudinal seam comprises a joint of the laminate through which moisture can penetrate into the layer structure of the laminate, in particular the carrier layer consisting usually of cardboard or paperboard. This must be prevented, at least on the inside of the longitudinal seam, because the container is designed to contain food containing water. In the prior art, a polymer sealing strip is therefore sealed on the inside along the length of the longitudinal seam. Such a sealing strip constitutes an additional component to be applied in the manufacturing process of the container. Further, the sealing strip must be sealable. Thus it cannot, unlike the normal barrier layer, consist merely of an aluminium layer. In order to achieve a barrier effect in the sealing strip, the sealing strip of the state of the art often consists of a sealable plastic with a barrier effect, such as an EVOH layer. However, such a plastic, which is capable of forming a barrier, is relatively expensive, which increases the production costs of the container. Also, the seal of the sealing strip must be totally impermeable over the entire length of the longitudinal seam so as to be able to prevent the ingress of moisture, as the seal and hence a seam along the entire length of the longitudinal seam on either side of the sealing strip faces the inside and hence the food.

In general, an object of the present invention is to overcome, at least partially, a disadvantage resulting from the prior art. A further object of the invention is to provide a container, or a container precursor, or both, wherein a process for manufacturing the container, or the container precursor, is selected from a group consisting of a process that needs less time, or is cheaper, or requires fewer components, or a combination of at least two thereof. A further object of the invention is to provide a container that is more stable against compression. A further object of the invention is to provide a container that can be manufactured with a lower reject rate. A further object of the invention is to provide a container, or a container precursor, or both, wherein the container, or the container precursor, contains no plastic barrier or contains no additional barrier strips to seal the container, or the container precursor, on the inside. A further object of the invention is to provide a container, or a container precursor, or both, wherein as few seams or sealing connections as possible are exposed to the food placed inside the container, or the container precursor. A further object of the invention is to provide a container, or a container precursor, or both, wherein a process for manufacturing the container, or the container precursor, is characterised by one selected from a group consisting of a process involving less dust formation, or less noise generation, or longer service life of the cutting tool, or a combination of at least two thereof. A further object of the invention is to provide a container, or a container precursor, or both, wherein there is as little additional bonding material, for example a sealing layer or an adhesive, as possible between superimposed peeled areas of a carrier material of the container, or the container precursor. A further object of the invention is to provide a container, or a container precursor, or both, wherein there is a greater choice of layer thickness of a peeled carrier layer of the container, or the container precursor. A further object of the invention is to provide a container, or a container precursor, or both, wherein a peeled area of a wall of the container, or the container precursor, is more stable or more sturdy and, therefore, more durable or easier to work, or both. A further object of the invention is to provide a container, or a container precursor, or both, wherein a seam, preferably a longitudinal seam, of the container, or of the container precursor, is protected against the ingress of moisture on the inside, or on the outside, or both. A further object of the invention is to provide a container, wherein the container's bacterial count is lower for the same amount of sterilisation. A further object of the invention is to provide a container, wherein the container possesses a combination of 2 or more of the abovementioned advantages. A further object of the invention is to provide a process for the manufacture of containers, wherein the percentage of defective containers, or container precursors, produced by the process is lower. A further object of the invention is to provide a process for the manufacture of containers, wherein fewer containers with an increased bacterial count are produced using the process. A further object of the invention is to provide a process for the manufacture of containers, wherein a lower percentage of defective containers can be produced using the process. A further object of the invention is to provide a process for the manufacture of containers, wherein a lower production tolerance in connection with a seam, preferably a low variation in seam width, of the container can be achieved using the process. A further object of the invention is to provide a process for the manufacture of containers, wherein the process exhibits increased process stability. A further object of the invention is to provide a process for the manufacture of containers, wherein the process is simpler, or faster, or both. A further object of the invention is to provide a process for the manufacture of containers, wherein less space is required to accommodate production plants for the implementation of the process. A further object of the invention is to provide a process for the manufacture of containers, wherein the process possesses a combination of 2 or more of the above advantages.

A contribution to the at least partial fulfilment of at least one of the above tasks is made by the independent claims. The dependent claims provide preferred embodiments which contribute to the at least partial fulfilment of at least one of the above tasks.

A contribution to the fulfilment of at least one of the tasks of the invention is made by embodiment 1 of a container precursor 1, comprising a wall, wherein the wall
  a) surrounds an interior region, and
  b) comprises a first wall region and a second wall region;
wherein the first wall region comprises a first layer sequence comprising a first wall layer, a second wall layer and a third wall layer as overlying layers from the interior region outwards; wherein, in the first wall region, the first wall layer is connected to the second wall layer and the second wall layer is connected to the third wall layer; wherein the first wall layer, as first wall layer sequence from the interior region outwards, comprises a first barrier layer comprising aluminium, and a first carrier layer; wherein the second wall layer, as second wall layer sequence from the interior region outwards, comprises a second carrier layer and a second barrier layer comprising aluminium; wherein the third wall layer, as third wall layer sequence from the interior region outwards, comprises a third barrier layer comprising aluminium, and a third carrier layer; wherein, in the first wall region, the second carrier layer is characterised by a smaller layer thickness than the first carrier layer, or the third carrier layer, or both; wherein the second wall region comprises a second layer sequence comprising the first wall layer, the second wall layer and the third wall layer as overlying layers from the interior region outwards; wherein, in the second wall region, the second wall layer is connected to the third wall layer; wherein, in the second wall region, the third carrier layer is characterised by a larger layer thickness than the second carrier layer, or the first carrier layer, or both.

An embodiment of the invention 2 of the container precursor 1 is configured according to embodiment 1, wherein the first wall region abuts the second wall region.

An embodiment of the invention 3 of the container precursor 1 is configured according to embodiment 1 or 2, wherein the first wall region is characterised by a first width along the circumference of the container precursor, wherein the first width is between 1 and 6 mm, preferably between 1 and 5 mm, more preferably between 2 and 4 mm, most preferably between 2 and 3 mm. The first layer sequence preferably has the first width along the circumference of the container precursor.

An embodiment of the invention 4 of the container precursor 1 is configured according to any one of the preceding embodiments, wherein the second wall region is characterised by a second width along the circumference of the container precursor, wherein the second width is between 1 and 10 mm, more preferably between 1 and 8 mm, preferably between 2 and 8 mm, more preferably between 2 and 6 mm, most preferably between 3 and 5 mm. The second layer sequence preferably has the second width along the circumference of the container precursor.

An embodiment of the invention 5 of the container precursor 1 is configured according to any one of the preceding embodiments, wherein, in the first wall region, the layer thickness of the second carrier layer is between 0.05 and 0.9 times, preferably between 0.1 and 0.85 times, more preferably between 0.2 and 0.85 times, more preferably between 0.3 and 0.85 times, more preferably between 0.4 and 0.85 times, still more preferably between 0.5 and 0.8 times, most preferably between 0.6 and 0.75 times the layer thickness of the first carrier layer, or of the third carrier layer, or of both layers.

An embodiment of the invention 6 of the container precursor 1 is configured according to any one of the preceding embodiments, wherein, in the second wall region, the layer thickness of the third carrier layer is between 1.1 and 20 times, preferably between 1.1 and 15 times, more preferably between 1.1 and 10 times, more preferably between 1.1 and 5 times, more preferably between 1.1 and 3 times, more preferably between 1.1 and 2 times, more preferably between 1.2 and 1.9 times, still more preferably between 1.2 and 1.8 times, most preferably between 1.3 and 1.7 times the layer thickness of the first carrier layer, or of the second carrier layer, or of both layers.

An embodiment of the invention 7 of the container precursor 1 is configured according to any one of the preceding embodiments, wherein, in the second wall region, the first wall layer is not connected to the second wall layer. The first wall layer is preferably in contact with, but not connected to, the second wall layer in the second wall region. In the second wall region, preferably at least 20%, more preferably at least 30%, more preferably at least 40%, more preferably at least 50%, more preferably at least 60%, more preferably at least 70%, still more preferably at least 80%, still more preferably at least 90%, most preferably at least 95%, of a surface of the first wall layer facing the second wall layer is in contact with, and preferably not connected to, the second wall layer. Also, the first wall layer and the second wall layer are preferably held together in such a way that they are joined together in at least one wall region, preferably the first wall region, abutting the second wall region. In the second wall region, the first wall layer may be neither connected to nor in contact with the second wall layer in a further embodiment. In a further embodiment of the invention, the first wall layer and the second wall layer are connected together in the second wall region preferably on at least 20%, more preferably on at least 30%, more preferably on at least 40%, more preferably on at least 50%, more preferably on at least 60%, more preferably on at least 70%, still more preferably on at least 80%, still more preferably on at least 90%, most preferably on at least 95%, of a surface of the first wall layer facing the second wall layer. The first wall layer and the second wall layer in the second wall region are preferably pressed together, or sealed together, or both.

An embodiment of the invention 8 of the container precursor 1 is configured according to any one of the preceding embodiments, wherein, in the second wall region
  a) a surface of the first carrier layer facing the second carrier layer, and
  b) a surface of the second carrier layer facing the first carrier layer
each does not comprise a cover layer, preferably not a "coating" and is not connected to a cover layer, preferably not a "coating".

An embodiment of the invention 9 of the container precursor 1 is configured according to any one of the preceding embodiments, wherein, in the first wall region, a surface of the second carrier layer facing the first carrier layer does not comprise a cover layer, preferably not a "coating" and is not connected to a cover layer, preferably not a "coating".

An embodiment of the invention 10 of the container precursor 1 is configured according to any one of the preceding embodiments, wherein one selected from the group consisting of the first carrier layer, the second carrier layer and the third carrier layer, or a combination of at least two thereof, preferably each carrier layer, comprises one selected from a group consisting of cardboard, paperboard and paper, or a combination of at least two thereof.

An embodiment of the invention 11 of the container precursor 1 is configured according to any one of the preceding embodiments, wherein the wall comprises a third wall region; wherein the third wall region comprises a third wall sequence comprising the first wall layer and the third wall layer as overlying layers from the interior region outwards; wherein, in the third wall region, the first wall layer is connected to the third wall layer; wherein the third wall region abuts against the first wall region.

An embodiment of the invention 12 of the container precursor 1 is configured according to embodiment 11, wherein the third wall region is characterised by a third width along the circumference of the container precursor, wherein the third width is between 1 and 12 mm, preferably between 1 and 10 mm, more preferably between 1 and 8 mm, more preferably between 2 and 6 mm, more preferably between 3 and 6 mm, most preferably between 5 and 6 mm. The third layer sequence preferably has the third width along the circumference of the container precursor.

A contribution to the fulfilment of at least one of the tasks of the invention is made by an embodiment 1 of a process 1, comprising the following process steps a) Provision of a sheet-like composite, comprising
  i) A composite layer sequence, comprising
    A) a composite carrier layer, and
    B) a composite barrier layer, comprising aluminium,
  ii) an edge region, and
  iii) an inner region adjoining the edge region;
b) Reduction of the layer thickness of the composite carrier layer in the edge region;
c) Creation of a fold in the edge region to obtain a first edge fold region and a further edge fold region, wherein the first edge fold region and the further edge fold region abut against each other along the fold;
d) Bringing the first edge fold region into contact with a first part of the further edge fold region, and connecting a further part of the further edge fold region to the inner region;
e) Creation of a further fold in the inner region to obtain a first composite fold region and a further composite fold region, wherein the further composite fold region comprises the edge region;
f) Connecting the first composite fold region to the first part of the further edge fold region and the further part of the further edge fold region.

An embodiment of the invention 2 of the process 1 is configured according to embodiment 1, wherein, in process step e), the further composite fold region comprises a part of the inner region; wherein, in process step f), the first composite fold region is further connected to the part of the inner region.

An embodiment of the invention 3 of the process 1 is configured according to embodiment 1 or 2, wherein, in process step b), reduction is carried out by peeling the composite carrier layer.

An embodiment of the invention 4 of the process 1 is configured according to embodiment 3, wherein peeling is carried out by a rotating tool.

An embodiment of the invention 5 of the process 1 is configured according to embodiments 1 to 4, wherein, in process step a), the sheet-like composite comprises a crease, wherein, in process step e), the creation of the further fold comprises a fold along the crease.

A contribution to the fulfilment of at least one of the tasks of the invention is made by an embodiment 1 of a container precursor 2, wherein the container precursor is obtainable through the process 1 according to one of its embodiments 1 to 5.

A contribution to the fulfilment of at least one of the tasks of the invention is made by an embodiment 1 of a closed container 1, obtainable by folding the container precursor 1 according to any one of its embodiments 1 to 12 or the container precursor 2 according to its embodiment 1 and closing the folded container precursor with a closing tool.

An embodiment of the invention 2 of the closed container 1 is configured according to embodiment 1, wherein the wall surrounds the interior region on all sides, wherein the wall consists of a one-piece sheet-like composite. The closed container preferably does not comprise a floor that is not formed in one piece with the sheet-like composite or a cover that is not formed in one piece with the sheet-like composite, or both.

An embodiment of the invention 3 of the closed container 1 is configured according to embodiment 1 or 2, wherein one selected from a group comprising the first layer sequence, the second layer sequence and the third layer sequence, or a combination of at least two thereof, preferably each layer sequence, comprises a further carrier layer.

An embodiment of the invention 4 of the closed container 1 is configured according to embodiments 1 to 3, wherein, in the first wall region and the second wall region, the first wall layer is overlaid by a fourth wall layer on a side facing the interior region; wherein the fourth wall layer, as a fourth wall layer sequence from the interior region outwards, comprises a fourth carrier layer and a fourth barrier layer, comprising aluminium; wherein, in the first wall region, the second carrier layer is characterised by a smaller layer thickness than the fourth carrier layer; wherein, in the second wall region, the fourth carrier layer is characterised by a larger layer thickness than the second carrier layer, or the first carrier layer, or both. In this embodiment, the first wall region and the further wall region preferably belong to a head portion or to a bottom portion of the closed container. The fourth wall layer is preferably connected to the first wall layer in the first wall region and the second wall region.

An embodiment of the invention 5 of the closed container 1 is configured according to embodiment 4, wherein, in the third wall region, the fourth wall layer overlays the first wall layer on a side facing the interior region. The fourth wall layer is preferably connected to the first wall layer in the third wall region.

A contribution to the fulfilment of at least one of the tasks of the invention is made by an embodiment 1 of a process 2, comprising the following process steps
 a) Provision of the container precursor 1 according to any one of its embodiments 1 to 12 or the container precursor 2 according to its embodiment 1;
 b) Folding the container precursor; and
 c) Closing the container precursor with a closing tool to obtain a closed container.

An embodiment of the invention 2 of the process 2 is configured according to embodiment 1, wherein food is introduced into the container precursor before process step c), preferably after process step b).

An embodiment of the invention 3 of the process 2 is configured according to embodiment 1 or 2, wherein the closed container is autoclaved after process step c).

An embodiment of the invention 4 of the process 2 is configured according to embodiments 1 to 3, wherein the container precursor is sterilised before process step c), preferably after process step b), and preferably before food is introduced into the container precursor. Sterilisation is preferably carried out through contact with gaseous hydrogen peroxide, or liquid hydrogen peroxide, or both. Contact is preferably made through immersion, rinsing, or spraying, or a combination or at least two thereof.

A contribution to the fulfilment of at least one of the tasks of the invention is made by an embodiment 1 of a close container 2, obtainable through the process 2 according to any one of its embodiments 1 to 4.

A contribution to the fulfilment of at least one of the tasks of the invention is made by an embodiment 1 of a use 1 of the container precursor 1 according to any one of its embodiments 1 to 12 or of the container precursor 2 according to its embodiment 1 for the manufacture of a closed container.

A contribution to the fulfilment of at least one of the tasks of the invention is made by an embodiment 1 of a use 2 of the container precursor 1 according to any one of its embodiments 1 to 12 or of the container precursor 2 according to its embodiment 1 for filling it with food.

Preferred embodiments of components of a category according to the invention, in particular of the container precursor, the process according to the invention and the closed container, are also preferred for components of the same name, or corresponding components, of the other categories according to the invention.

Layers

Two layers are bonded to each other when their adhesion to each other goes beyond van der Waals attraction forces. Layers that are bonded together are preferably sealed together, or glued together, or pressed together, or bonded through a combination of two or more of these measures. Unless otherwise specified, in a layer sequence the layers may follow each other indirectly, that is to say with one or at least two intermediate layers, or directly, that is to say without an intermediate layer. This is the case, in particular, with formulation, in which a layer overlays another layer. A formulation in which a layer sequence comprises enumerated layers means that at least the specified layers are in the specified sequence. This formulation does not necessarily mean that these layers have to be in immediate succession. A formulation in which two layers abut against each other means that these two layers are in immediate succession without an intermediate layer. However, this formulation does not indicate whether the two layers are bonded together or not. Rather, these two layers may be in contact with each other.

Bonding

Bonding is preferably selected from the group consisting of sealing, gluing and pressing, or a combination of at least two thereof. In the case of sealing, the bond is created by means of a liquid and its solidification. In the case of gluing, chemical bonds form between the interfaces or surfaces of the two objects to be bonded together, which create the bond. In the case of sealing or gluing, it is frequently advantageous to press together the surfaces to be sealed or glued. A preferred form of pressing two layers is to press together a first surface of a first of the two layers onto a second layer facing the first layer of the second of the two layers over at least 20%, preferably at least 30%, more preferably at least 40%, more preferably at least 50%, more preferably at least 60%, more preferably at least 70%, still more preferably at least 80%, still more preferably at least 90%, most preferably at least 95%, of the first surface. A particularly preferred form of pressing is sealing. Sealing preferably comprises the process steps of heating, laying one on top of the other, and pressing, wherein the process steps preferably follow each other in this sequence. Another sequence is also conceivable, in particular the sequence of laying the layers one on top of the other, heating, and pressing. Preferential heating is heating of a polymer layer, preferably a thermoplastic layer, more preferably a polyethylene layer, or a polypropylene layer, or both. A further preferred form of heating is heating of a polyethylene layer to a temperature of between 80 and 140° C., more preferably between 90 and 130° C., most preferably between 100 and 120° C. A further preferred form of heating is heating of a polypropylene layer to a temperature of between 120 and 200° C., more preferably between 130 and 180° C., most preferably between 140 and 170° C. A further preferred form of heating is carried out to a seal temperature of the polymer layer. A preferred form of heating may be carried out through radiation, through hot gas, through solids heat contact, through mechanical vibrations, or through a combination of at least two of these measures. A particularly preferred form of heating is carried out through the excitation of an ultrasonic vibration.

Contacting

A preferred from of contacting is pressing together.

Cover Layer

A preferred cover layer is a "coating". In paper manufacturing, a "coating" is a cover layer which comprises inorganic solid particles, preferably pigments and additives. The "coating" is preferably applied as a liquid phase, preferably as a suspension or a dispersion, to a surface of a layer containing paper or cardboard. A preferred dispersion is an aqueous dispersion. A preferred suspension is an aqueous suspension. A further preferred liquid phase comprises inorganic solid particles, preferably pigments, a binder, and an additive. A preferred pigment is one selected from the group consisting of calcium carbonate, kaolin, talc, silicate, a plastic pigment, and titanium oxide. A preferred kaolin is calcinated kaolin. A preferred calcium carbonate is one selected from a group consisting of marble, chalk and a precipitated calcium carbonate (PCC) or a combination of at least two thereof. A preferred silicate is a layer silicate. A preferred plastic pigment is spherical, preferably in the shape of a hollow sphere. A preferred binder is one selected from the group consisting of styrene-butadiene, acrylate, acrylonitrile, starch and polyvinyl alcohol or a combination of at least two thereof, wherein acrylate is preferred. A preferred starch is one selected from the group consisting of cationically modified, anionically modified, and fragmented, or a combination of at least two thereof. A preferred additive is one selected from the group consisting of a rheology modifier, a shading dye, an optical brightener, a carrier for an optical brightener, a flocculent, a deaerating agent, and a surface energy modifier, or a combination of at least two thereof. A preferred deaerating agent is a coating colour deaerating agent, preferably based on silicone or on fatty acids, or both. A preferred surface energy modifier is a surfactant.

Carrier Layer

As a carrier layer, any material deemed suitable by the person skilled in the art may be used, which has sufficient strength and stiffness to give the container enough stability to ensure that the container in the filled state substantially retains its shape. In addition to a number of plastics, plant fibres, in particular pulp, preferably glued, bleached and/or unbleached pulp are preferred, with paper and cardboard being particularly preferred. The weight per unit area of a carrier layer, preferably of each carrier layer, is preferably in a range from 120 to 450 g/m$^2$, particularly preferably in a range from 130 to 400 g/m$^2$ and most preferably in a range from 150 to 380 g/m$^2$. A preferred cardboard usually has a single- or multi-layer structure and may be coated on one or both sides with one or even several cover layers. Further, a suitable cardboard has a residual moisture of less than 20% by weight, preferably from 2 to 15% by weight and particularly preferably from 4 to 10% by weight, relative to the weight of the cardboard. A particularly preferred cardboard has a multi-layer structure. Further, the cardboard preferably has, on the surface facing the environment, at least one, preferably, however, at least two layers of a cover layer, known to the person skilled in that art as a "coating". Further, a preferred cardboard has a Scott Bond value in a range from 100 to 360 J/m$^2$, preferably from 120 to 350 J/m$^2$ and particularly preferable from 135 to 310 J/m$^2$. The ranges specified above make it possible to provide a composite from which a container with high impermeability can be folded easily and within small tolerances. A preferred carrier layer comprises at least a surface, with preferably a cover layer on each of two opposite surfaces. Each carrier layer preferably comprises a cover layer on each surface, unless this is expressly excluded. Most preferably, each carrier layer does not comprise a cover layer only on one peeled surface, if there is one. Preferably, the first carrier layer and the second carrier layer are formed in one piece. More preferably, the first carrier layer and the second carrier layer and the third carrier layer are formed in one piece. Still more preferably, the first carrier layer and the second carrier layer and the third carrier layer and the fourth carrier layer are formed in one piece. Most preferably, all carrier layers are formed in one piece.

Barrier Layer

As barrier layer, any material deemed suitable by the person skilled in the art may be used, which has a sufficient barrier effect, in particular against oxygen, wherein according to the invention every barrier layer comprises aluminium. The barrier layer is preferably selected from a. a metal layer; or
b. a metal oxide layer; or
c. a combination of a. and b.

According to alternative a., the barrier layer is a metal layer. As the metal layer, in principle all layers with metals which are known to the skilled person and which can produce a high light and oxygen impermeability are suitable. According to a preferred embodiment, the metal layer can be present as a foil or as a deposition layer, e.g. following a physical vapour deposition. The metal layer is preferably a continuous layer. According to a further preferred embodiment, the metal layer has a layer thickness in the range from 3 to 20 μm, preferably in a range from 3.5 to 12 μm and particularly preferably in a range from 4 to 10 μm.

Preferred selected metals are aluminium, iron or copper. As iron layer, a steel layer, for example in the form of a foil may be preferred. In each case, the metal layer comprises a layer having aluminium. The aluminium layer can, where appropriate, consist of an aluminium alloy, for example AlFeMn, AlFe1.5Mn, AlFeSi or AlFeSiMn. The purity is usually 97.5% or higher, preferably 98.5% or higher, based on the entire aluminium layer. In a particular embodiment, the metal layer consists of an aluminium foil. In a particular embodiment, the metal layer consists of an aluminium foil. Suitable aluminium foils have ductility of more than 1%, preferably of more than 1.3% and most preferably of more than 1.5%, and a tensile strength of more than 30 N/mm$^2$, preferably of more than 40 N/mm$^2$ and most preferably of more than 50 N/mm$^2$. Suitable aluminium foils exhibit a droplet size of more than 3 mm, preferably of more than 4 mm and most preferably of more than 5 mm in the pipette test. Suitable alloys for creating aluminium layers or foils are commercially available under the designations EN AW 1200, EN AW 8079 or EN AW 8111 from Hydro Aluminium Deutschland GmbH or Amcor Flexibles Singen GmbH.

In the case of a metal foil as a barrier layer, an adhesion-promoting layer may be provided on one and/or both sides of the metal foil between the metal foil and an adjacent polyolefin layer. According to a particular embodiment of the container according to the invention, however, no adhesive layer is provided on either side of the metal foil between the metal foil and the nearest polyolefin layer.

Further preferred, according to alternative b, a metal oxide layer can be chosen as barrier layer. All metal oxide layers which are familiar to the skilled person and appear to be suitable to achieve a barrier effect against light, steam and/or gas may be considered as metal oxide layers, wherein each barrier layer comprises aluminium. Particularly preferred are metal oxide layers based on the previously mentioned metals aluminium, iron or copper, as well as metal oxide layers that are based on titanium or silicon oxide compounds. A metal oxide layer is produced for example by vaporising a layer of plastic, for example, an oriented polypropylene film, with a metal oxide. A preferred process for this is the physical vapour deposition.

According to a further preferred embodiment, the metal layer of the metal oxide layer can be present as a layer composite consisting of one or more plastic layers with a metal layer. Such a layer can be obtained, for example, by vaporising a layer of plastic, for example, an oriented polypropylene film, with a metal oxide. A preferred process for this is the physical vapour deposition.

In the above embodiment, aluminium is always to be regarded as the most preferred metal and aluminium oxide always as the most preferred metal oxide.

Each barrier layer comprises and is preferably composed of aluminium. A preferred barrier layer, preferably each barrier layer contains at least 50 wt.-%, preferably at least 60 wt.-%, more preferably at least 70 wt.-%, more preferably at least 80 wt.-%, more preferably at least 90 percent wt.-%, more preferably at least 95 wt.-%, most preferably at least 98 wt.-%, aluminium, based on the total weight of the barrier layer.

The first barrier layer and the second barrier layer are preferably formed in one piece. More preferably, the first barrier layer and the second barrier layer and the third barrier layer are formed in one piece. Still more preferably, the first layer and the second barrier layer and the third barrier layer and the fourth barrier layer are formed in one piece. Most preferably, all barrier layers are formed in one piece.

Polymer Layers

There is preferably a polymer layer between the first carrier layer and the first barrier layer, also preferably between the second carrier layer and the second barrier layer, also preferably between the third carrier layer and the third barrier layer, and also preferably between the fourth carrier layer and the fourth barrier layer. Further, the first barrier layer is preferably overlaid by a polymer layer on a side facing the first carrier layer, preferably bonded with the polymer layer. Further, the second barrier layer is preferably overlaid by a polymer layer on a side facing the second carrier layer, preferably bonded with the polymer layer. Further, the third barrier layer is preferably overlaid by a polymer layer on a side facing the third carrier layer, preferably bonded with the polymer layer. Further, the fourth barrier layer is preferably overlaid by a polymer layer on a side facing the fourth carrier layer, preferably bonded with the polymer layer. Further, the first carrier layer is preferably overlaid by a polymer layer on a side facing the first barrier layer, preferably bonded with the polymer layer, in which case the first carrier layer is preferably not bonded with the polymer layer on the side facing the first barrier layer in the first wall region. Further, the second carrier layer is preferably overlaid by a polymer layer on a side facing the second barrier layer, preferably bonded with the polymer layer, in which case the second carrier layer is preferably not bonded with the polymer layer on the side facing the second barrier layer in the first wall region and the second wall region. Further, the third carrier layer is preferably overlaid by a polymer layer on a side facing the third barrier layer, preferably bonded with the polymer layer. Further, the fourth carrier layer is preferably overlaid by a polymer layer on a side facing the fourth barrier layer, preferably bonded with the polymer layer.

Each polymer layer may comprise further components. These polymer layers are preferably introduced into or applied to the layer sequence in an extrusion process. The further components of the polymer layers are preferably components which do not adversely affect the behaviour of the polymer melt when applied as a layer. The further components may be inorganic compounds, such as metal salts, or further plastics, such as further thermoplastic plastics. However, it is conceivable that the further components are fillers or pigments, for example carbon black or metal oxides. Suitable thermoplastic plastics for the further components are considered in particular to be those which are easy to work due to good extrusion behaviour. Among these, polymers obtained by means of chain polymerisation, in particular polyester or polyolefin, are suitable, with cyclic olefin-copolymers (COC), polycyclic olefin-copolymers (POC), in particular polyethylene and polypropylene, being particularly preferred and polyethylene most preferred. Among the polyethylenes, HDPE, MDPE, LDPE, LLDPE, VLDPE and PE as well as mixtures of at least two thereof are preferred. Mixtures of at least two thermoplastic plastics may also be used. Suitable polymer layers have a melt flow rate in a range from 1 to 25 g/10 min, preferably in a range from 2 to 20 g/10 min and most preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and more preferably in a range from 0.900 g/cm$^3$ to 0.970 g/cm$^3$. The polymer layers preferably have a melting temperature at least in a range from 80 to 155° C., preferably in a range from 90 to 145° C. and most preferably in a range from 95 to 135° C. A preferred polymer layer is a polyolefin layer, preferably a polyethylene layer, or a polypropylene layer, or both.

Polyolefin

A preferred polyolefin is a polyethylene, or a polypropylene, or both. A preferred polyethylene is one selected from the group consisting of an LDPE, an LLDPE, and an HDPE, or a combination of at least two thereof. A further preferred polyolefin is an mPolyolefin. Suitable polyethylenes have a melt flow rate (MFR) in a range from 1 to 25 g/10 min, preferably in a range from 2 to 20 g/10 min and most preferably in a range from 2.5 to 15 g/10 min, and a density in a range from 0.910 g/cm$^3$ t 0.935 g/cm$^3$, preferably in a range from 0.912 g/cm$^3$ to 0.932 g/cm$^3$, and more preferably in a range from 0.915 g/cm$^3$ to 0.930 g/cm$^3$.

mPolyolefin

An mPolyolefin is a polyolefin which is produced by means of a metallocene catalyst. A metallocene is a metallic organic compound in which a central metal atom is arranged between two organic ligands, such as cyclopentadienyl ligands, for example. A preferred mPolyolefin is an mPolyethylene, or an mPolypropylene, or both. A preferred mPolyethylene is one selected from the group consisting of an mLDPE, an mLLDPE, and an mHDPE, or a combination of at least two thereof.

Melting Temperatures

A preferred mPolyolefin is characterised by at least a first melting temperature and a second melting temperature. Preferably, the mPolyolefin is characterised by a third melting temperature in addition to the first and second melting temperature. A preferred first melting temperature lies in a range from 84 to 108° C., preferably from 89 to 103° C., more preferably from 94 to 98° C. A preferred further melting temperature lies in a range from 100 to 124° C., preferably from 105 to 119° C., more preferably from 110 to 114° C.

Adhesion/Adhesion Promoting Layer

There may be an adhesion promoting layer between layers of the wall which do not abut directly against each other. In particular, there may be an adhesion promoting layer between each n$^{th}$ barrier layer and a polymer layer which overlays the $n^{th}$ barrier layer on a side facing the $n^{th}$ carrier layer, where n is an integer in a range from 1 to 4.

Adhesion promoters in an adhesion promoting layer are considered to be all plastics which, through functionalisation by means of suitable functional groups, are suitable for generating a fixed connection through the formation of ionic bonds or covalent bonds with a surface of an adjoining layer. These are functionalised polyolefins, obtained through co-polymerisation of ethylene with acrylic acids, such as acrylic acid, methacrylic acid, crotonic acid, acrylates, acrylate derivatives, or carboxylic acid anhydrides bearing double bonds, for example maleic anhydride, or at least two thereof. Among these, polyethylene maleic anhydride grafted polymers (EMAH), ethylene acrylic acid copolymers (EAA) or ethylene methacrylic acid copolymers (EMAA) are preferred, which are sold, for example, by ExxonMobile Chemicals through DuPont or Escor®6000ExCo under the trade names Bynel® and Nucrel®0609HSA.

According to the invention, it is preferable that the adhesion between a carrier layer, a polymer layer or a barrier layer and the next layer is at least 0.5 N/15 mm, preferably at least 0.7 N/15 mm and more preferably at least 0.8 N/15 mm. In an embodiment according to the invention, it is preferable that the adhesion between a polymer layer and a barrier layer is at least 0.3 N/15 mm, preferably at least 0.5 N/15 mm and more preferably at least 0.7 N/15 mm. Further, it is preferable that the adhesion between a barrier layer and a polymer layer is at least 0.8 N/15 mm, preferably at least 1.0 N/15 mm and more preferably at least 1.4 N/15 mm. In the event that a barrier layer indirectly follows a polymer layer via an adhesion promoting layer, it is preferable that the adhesion between the barrier layer and the adhesion promoting layer is at least 1.8 N/15 mm, preferably at least 2.2 N/15 mm and more preferably at least 2.8 N/15 mm. In a special embodiment, the adhesion between the individual layers is so strong that, in the adhesion test, the carrier layer tears and, if cardboard is used as the carrier layer, the cardboard tears.

In One Piece

Two layers are formed in one piece if there is a transitional area in which the two layers abut against each other and merge into one another without an intermediate layer and without a connecting element. A preferred transitional area is a fold region. A fold region comprises a fold. A preferred fold runs along a crease. Layers formed in one piece have preferably been manufactured together from raw materials as one piece and have not been joined together following manufacture. Layers formed in one piece preferably have the same composition, or the same structure, or both.

Container Precursor

A preferred container precursor is shell-shaped or tubular, or both. A shell-shaped container precursor is preferably characterised in that its outer surface corresponds to a geometrical shell surface. A tubular container precursor is preferably a semi-endless tube structure with an opening on opposite ends of the tube.

Container

The closed container according to the invention may have a variety of different forms, but is preferably a substantially rectangular structure. Furthermore, the container may be formed from a sheet-like composite, or have a 2- or multi-piece construction. In a multi-piece construction, it is conceivable that, in addition to the sheet-like composite, other materials are used, such as plastic, which can be used in particular in the head or bottom portion of the container. In this case, however, it is preferred that the container is constructed for at least 50%, more preferably at least 70% and even more preferably up to at least 90% of the area from the sheet-like composite. Furthermore, the container pay comprise a device for emptying the contents. This can be formed, for example, from plastic and mounted on the outside of the container. It is also conceivable that the device is integrated into the container by direct injection moulding. According to a preferred embodiment, the container of the invention has at least one, preferably from 4 to 22 or more edges, particularly preferably 7 to 12 edges. Edge are understood in the context of the present invention as areas resulting from the folding of a surface. Examples of edges are the elongated contact areas of two wall surfaces of the container. In the container, the container walls preferably represent the surfaces of the container framed by the edges.

Peeling

Peeling is a process step known to the person skilled in the art to reduce the layer thickness of a layer, preferably a carrier layer, more preferably a carrier layer selected from the group consisting of cardboard, paperboard, and paper, or a combination of at least two thereof. Peeling is preferably carried out using a metal-removing tool, or a cutting tool, or both. A further preferred metal-removing tool is a rotating tool. A most preferred rotating tool is a knife, preferably a pot knife, or a milling tool, or both. A further preferred metal-removing tool is a knife, preferably a rotating knife, most preferably a pot knife, or a milling tool, or both.

Folding the Sheet-Like Composite or the Wall

The folded area of the wall or of the sheet-like composite is preferably folded in a temperature range from 10 to 50° C., preferably in a range from 15 to 45° C., and more preferably in a range from 20 to 40° C. This can be achieved if the sheet-like composite or the wall has a temperature in the aforementioned ranges. Further, a folding tool, preferably together with sheet-like composite or the wall, preferably has a temperature in the aforementioned ranges. For this, the folding tool does not have a heater. Rather, the folding tool, or the sheet-like composite and the wall, or both, can be cooled. Further it is preferred that folding is carried out at a temperature of no more than 50° C. as cold-folding and that connecting is carried out at a temperature of over 50° C., preferably over 80° C. and more preferably over 120° C. as heat-sealing. The foregoing conditions, in particular the temperatures, also preferably apply in the vicinity of the folding, for example, in the housing of the folding tool. Further, the cold-folding, or the cold-folding in combination with the heat-sealing, is preferably applied at fold-forming angles μ less than 100°, preferably less than 90°, more preferably less than 70° and most preferably less than 50°. The angle μ is formed between two adjoining fold surfaces.

Folding according to the invention is understood to mean a process in which an elongated, angle-forming crease is generated in the folded sheet-like composite or the wall preferably by means of a folding edge of a folding tool. For this, frequently two adjoining surfaces of a sheet-like composite or the wall must be increasingly bent towards one another. The folding gives rise to at least two adjoining folding surfaces, which can then be connected, at least partially, to form a container area. According to the invention, the connection can be made using any measure that appears suitable to the person skilled in the art which enables as gas-tight and water-tight a connection as possible to be formed.

Further, the fold surfaces preferably form an angle μ of less than 90°, preferably less than 45° and more preferably less than 20°. Frequently, the fold surfaces are folded to the extent that they come to lie on top of each other at the end of the fold. This is particularly advantageous, if the overlaying folds are then connected together to form the base of the container floor and the head of the container, which is often structured in the form of a gable or flat. Regarding the gable arrangement, reference is made to WO 90/09926 A2 by way of example.

Closing Tool

A preferred closing tool is formed to create a seal. A further preferred closing tool comprises at least an outlet opening for a hot gas. A further preferred closing tool comprises a sonotrode, or an anvil, or both.

Longitudinal Seam

The first wall region and the second wall region and preferably also the third wall region preferably belong to a longitudinal seam of the container precursor, or of the closed container. The first wall region and the second wall region and preferably also the third wall region preferably form a longitudinal seam of the container precursor, or of the closed container.

Food

Food is considered to be all food for human consumption and animal feed known to the person skilled in the art. Preferred foods are liquid above 5° C., for example milk products, soups, sauces, non-carbonated drinks. The container or the container precursor can be filled in various ways. On the one hand, the food and the container or the container precursor can be sterilised as far as possible, separately, prior to filling, through suitable measures, such as through treatment of the container or the container precursor with $H_2O_2$, UV radiation, or other suitable high-energy radiation, plasma treatment, or a combination of it least two of these measures, as well as through heating the food and then pouring it into the container. This type of filling is frequently referred to as aseptic filling and is preferred according to the invention. In addition to, or in place of, aseptic filling, heating the container or the container precursor after it has been filled with food to reduce the number of bacteria is widespread. This is done preferably through pasteurisation or autoclaving. With this process, less sterile food and containers or container precursors can be used.

Hole/Opening Aid

To facilitate the opening of the closed container of the invention, a carrier layer may comprise at least one hole. In a special embodiment, the hole is overlaid by at least a barrier layer and preferably a polymer layer as hole-cover layers. Further, one or several further layers, in particular adhesion promoting layers, can be provided between the abovementioned layers. In this case, the hole-cover layers are preferably connected together at least partially, preferably for at least 30%, preferably for at least 70%, and more preferably for at least 90% of the surface formed by the hole. According to a special embodiment, it is preferred that the hole penetrates the entire wall and is covered by the closing device closing the hole or the opening device. In connection with a preferred embodiment, the hole provided in the carrier layer may have any form known to the person skilled in the art and one that is suitable for various closures, drinking straws or opening aids. Usually, a closed container is opened by means of the, at least partial, destruction of the hole-cover layers covering the hole. This destruction may take place through cutting, pressing into the container, or pulling out of the container. The destruction may take place by means of an openable closing device or a drinking straw connected to the container and arranged in the area of the hole, usually above the hole.

According to a further preferred embodiment, a carrier layer of the wall comprises a plurality of holes in the form of a perforation, the individual holes being covered at least by a barrier layer, and preferably a polymer layer, as hole-cover layers. A container manufactured from such a composite can then be opened by tearing along the perforations. Such holes for perforations are preferably created by means of a laser. The use of laser beams is particularly preferred if a metal foil or a metalised foil is used as a barrier layer. Further, it is possible for the perforation to be created by mechanical perforation tools, usually having blades.

According to a further preferred embodiment, the wall or the sheet-like composite is subjected to heat treatment at least in the area of the at least one hole. If there are several holes in the form of a perforation in the carrier layer, it is particularly preferred to carry out this heat treatment also around the edge of the hole. The heat treatment may be carried out through radiation, through hot gas, through a solids heat contact, through mechanical vibrations, preferably through ultrasound, or through a combination of at least two of these measures. Heat treatment is particularly preferably carried out through radiation, preferably electromagnetic radiation and, particularly preferably, electromagnetic induction or also through hot gas. The optimal operating parameters to be chosen are known to the average person skilled in the art.

Radiation

In the case of radiation, any type of radiation deemed suitable by the person skilled in the art for softening the plastics of the polymer layers is taken into consideration. Preferred types of radiation are IR rays, UV rays, and microwaves. In the case of IR waves, which are also used for the IR welding of sheet-like composites, wavelengths are in a range from 0.7 to 5 µm. Further, laser beams in a wavelength range from 0.6 to less than 1.6 µm can be used. In connection with the use of IR rays, these are generated by various suitable emitters known to the person skilled in the art. Short-wave emitters in a range from 1 to 1.6 µm are preferably halogen emitters. Medium-wave emitters in a range from >1.6 to 3.5 µm are, for example, metal-foil emitters. Quartz emitters are frequently used as long-wave emitters in a range >3.5 µm. Lasers are used increasingly often. Diode lasers in a wavelength range from 0.8 to 1 µm, Nd:YAG lasers at approximately 1 µm, and $CO_2$-Laser lasers at approximately 10.6 µm, are used. High-frequency technologies with a frequency range from 10 to 45 MHz are frequently used in an output range from 0.1 to 100 kW.

Ultrasound

In the case of ultrasound, the following treatment parameters are preferred:

| | |
|---|---|
| P1 | a frequency in a range from 5 to 100 kHz, preferably in a range from 10 to 50 kHz and more preferably in a range from 15 to 40 kHz; |
| P2 | an amplitude in a range from 2 to 100 µm, preferably in a range from 5 to 70 µm kHz and more preferably in a range from 10 to 50 µm; |
| P3 | period of vibration (i.e. the period of time in which a vibrating body such as a sono-trode or inductor acts on the sheet-like composite like a contact rocker) in a range from 50 to 1000 msec, preferably in a range from 100 to 600 msec, and more preferably in a range from 150 to 300 msec. |

For the appropriate selection of radiation or vibration conditions, it is advantageous to consider the internal resonances of the plastics and to select frequencies that are close to them.

Contact with a Solid

Heating via contact with a solid may take place, for example, through a hotplate or hot mould that is in direct contact with the sheet-like composite, which transmits heat to the sheet-like composite.

Hot Gas

Hot gas, preferably hot air, may be directed at the sheet-like composite by means of suitable fans, outlet openings or nozzles, or a combination thereof. Frequently, a contact heater and hot gas are used simultaneously. For example, a holding device for a tube formed from the sheet-like composite, through which hot gas has flowed and which has therefore been heated, and which transmits the hot gas through suitable openings, may heat the sheet-like composite through contact with the wall of the holding device and the hot gas. Further, the tube may be heated by fixing it to a tube bracket and by passing hot gas through the areas of the tube to be heated by means of one or two or more hot gas nozzles provided in the shroud support.

Sterilisation

Sterilisation describes the treatment of a product, preferably a container, or a food, or both, in order to reduce the number of bacteria on or in the product. Sterilisation may, for example, take place through the application of heat or through contact with a chemical. The chemical can be gaseous, or liquid, or both. A preferred chemical is hydrogen peroxide.

Autoclaving

Autoclaving describes the treatment of a product, usually a filled and closed container, wherein the product is in a pressure chamber and is heated to a temperature of more than 100° C., preferably between 100 and 140° C. In addition, the chamber pressure in the pressure chamber is above 1 bar, preferably above 1.1 bar, more preferably above 1.2 bar, more preferably above 1.3 bar, and up to 4 bar. Further, autoclaving is preferably carried out with the product in contact with water vapour.

Pasteurisation

Pasteurisation describes the rapid heating of liquid or pasty foodstuffs to temperatures of up to 100° C. to kill, or inhibit the growth of, micro-organisms. It is used to increase the shelf-life of, inter alia, milk, fruit and vegetable juice, and liquid ice.

Measurement Methods

The following measurement methods were used in the context of the invention. Unless otherwise stated, the measurements were carried out at an ambient temperature of 25° C., an ambient air pressure of 100 kPa (0.986 atm) and a relative humidity of 50%.

MFR Value

The MFR value is measured in accordance with standard ISO 1133 (unless specified otherwise at 190° C. and 2.16 kg).

Density

Density is measured in accordance with standard Norm ISO 1183-1.

Melting Temperature

The melting temperature is determined on the basis of DSC Method ISO 11357-1, -5. Equipment calibrations are carried out in accordance with manufacturers' specifications on the basis of the following measurements:

Indium temperature—Onset temperature,
Indium heat of fusion,
Zink temperature—Onset temperature.

Oxygen Permeation Rate

The oxygen permeation rate is determined in accordance with standard ISO 14663-2 Annex C at 20° C. and 65% relative humidity.

Moisture Content of the Cardboard

The moisture content of the cardboard is measured in accordance with standard ISO 287:2009.

Adhesion

To determine the adhesion of two adjacent layers, they are fixed to a 90° Peel Test Device, manufactured, for example, by Instron "German rotating wheel fixture", on a rotating cylinder, which rotates at 40 mm/min during the measurement. The samples are cut into 15 mm broad strips beforehand. On one side of the sample, the layers are separated from each other and the detached end is clamped in a tensile testing device directed vertically upwards. A measuring device is mounted on the tensile testing device to determine the tensile force. When the cylinder is rotated, the force that is necessary to separate the layers from each other is measured. This force corresponds to the adhesion of the layers to each other and is given in N/15 mm. The individual layers can be separated, for example, mechanically or through targeted pretreatment, such as allowing the sample to soften for 3 min in 60° C., 30% acetic acid.

Layer Thickness

A sample measuring approximately 2.5 to 3.0 cm×1.0 to 1.5 cm is taken from the composite material to be examined. The long side of the sample is placed transversely to the direction of the extrusion and to the direction of the fibre of the cardboard. The sample is fixed in a metal clamp, which forms a smooth surface. The sample should not protrude more than 2 to 3 mm. The metal clamp is fixed prior to cutting. In order to obtain a clean cut, especially of the cardboard fibres, the part of the sample protruding from the metal clamp is frozen with cold spray. This is then removed using a disposable blade (Leica, Microtome Blades). The hold of the sample in the metal clamp is now eased to such an extent that the sample can be pushed approximately 3 to 4 mm out of the metal clamp. It is then fixed again. For examination under the light microscope (Nicon Eclipse E800), the sample is placed in the sample holder on the object plate of the light microscope under one of the lenses (magnification ×2.5; ×5; ×10; ×20; ×50). The appropriate lens is chosen on the basis of the layer thickness of the layer of the area to be examined. Precise centring is carried out during microscopy. In most cases side lighting (swan-neck lights) is used as the source light. If necessary, the incident-light illuminator of the light microscope is used in addition or alternatively. If the sample is optimally sharpened and illuminated the individual layers of the composite should be recognisable. An Olympus camera (Olympus DP 71) with suitable image processing software (analySIS) by Analysis is used for documentation and measurements. It is also used to determine the layer thickness of the individual layers.

Compression Test

For this test, 5 containers are manufactured and filled with water before the process step of folding the container precursor and before the process step of closing the container precursor. The purpose of the test is to determine the compressive strength along the longitudinal axis of the container. It may also be used to assess the resilience of filled containers in the static case of storage and in the dynamic case of transportation. The compression test is carried out on the individual containers in accordance with DIN EN ISO12048. The preceding storage of the containers is carried out in accordance with DIN EN ISO 2233:2000. The measuring device used is TIRAtest 28025 (Tira GmbH; Eisfelder Strasse 23/25; 96528 Schalkau, Germany). The mean value of the maximum breaking load (load value) is determined. This describes the value that leads to the failure of the containers.

The invention is presented in more detail below through examples and drawings. The examples and drawings do not signify any limitation of the invention.

For the examples (according to the invention) and the comparative examples (not according to the invention), laminates with the following layer structure and layer sequence were generated through a layer extrusion process.

| Layer structure/layer sequence | Weight per unit area | Index |
|---|---|---|
| LDPE | 15 g/m² | (3) |
| Carrier layer | 240 g/cm² | (2) |
| LDPE | 18 g/m² | (3) |
| Barrier layer | 6 μm | (1) |
| Adhesion promotion layer | 4 g/m² | (5) |
| LDPE | 22 g/m² | (3) |
| mPE blend | 10 g/m² | (4) |

The details of the above indices are:
(1) Aluminium, EN AW 8079, thickness=6 μm from Hydro Aluminium Deutschland GmbH
(2) Cardboard: Stora Enso Natura T Duplex Doppelstrich, Scott bond 200 J/m², residual moisture content 7.5%
(3) LDPE 19N430 from Ineos GmbH, Cologne
(4) m-PE Blend: 35% by weight Affinity® PT 1451G1 from Dow Chemicals and 65% by weight LDPE 19N430 from Ineos GmbH, Cologne
(5) Escor 6000 HSC Exxonmobile The geometries of the longitudinal seam summarised in Table 1 below were generated in the examples (according to the invention) and the comparative examples (not according to the invention). In Table 1 the smaller thickness of a carrier layer means that this carrier layer was peeled. Peeled carrier layers have a thickness of 230 μm. The larger thickness of the carrier layer means that this carrier layer, with the larger thickness, is unpeeled. If all the carrier layers of a laminate are of equal thickness, this means that all the carrier layers are unpeeled. Unpeeled carrier layers have a thickness of 430 μm.

TABLE 1

Longitudinal seam geometries according to the examples and comparative examples

|  | Thicknesses of the carrier layers in the first wall region (103) | Thicknesses of the carrier layers in the second wall region (104) | Existence of a third wall region (301) in the longitudinal seam |
|---|---|---|---|
| Comparative example 1 | first (205) = third (209) | first (205) = third (209) | no |
| Comparative example 2 | second (206) < first (205) = third (209) | second (206) = first (205) = third (209) | no |
| Example 1 | second (206) < first (205) = third (209) | second (206) < first (205) = third (209) | no |
| Example 2 | second (206) = first (205) < third (209) | second (206) = first (205) < third (209) | no |
| Example 3 | second (206) < first (205) = third (209) | second (206) = first (205) < third (209) | no |
| Example 4 | second (206) < first (205) = third (209) | second (206) = first (205) < third (209) | yes |

In comparative example 1 none of the carrier layers in the longitudinal seam was peeled. All carrier layers are 430 μm thick. Accordingly, for the longitudinal seam, no seam was generated through the folding of the laminate and the laminate folding over on itself. There is, therefore, no second carrier layer (206) which is generated by the folding. As there is no peeling, the first wall region (103) and the second wall region (104) are identical. In a longitudinal seam according to comparative example 1, there is no third wall region (301), in which the first wall layer (201), which contains the first carrier layer (205), is connected directly to the third wall layer (203), which contains the third carrier layer (209). In FIG. 8, this seam geometry is demonstrated in a container precursor.

In comparative example 2, which is not according to the invention, the second carrier layer (206) was only peeled in a peripheral area. The fold for folding the second wall layer (202) over onto the first wall layer (201) was generated in the unpeeled area of the second carrier layer (206) in the unpeeled area lying further from the edge. Therefore, the second carrier layer (206) in the first wall region (103) is peeled and hence thinner than the first carrier (205), but, in the second wall region (104), it is not peeled and hence as thick as the first carrier layer (205). In a longitudinal seam according to comparative example 2, there is no third wall region (301), in which the first wall layer (201), which contains the first carrier layer (205), is connected directly to the third wall layer (203), which contains the third carrier layer (209). The seam geometry of comparative example 2 is illustrated in FIG. 11 in a container precursor.

In example 1 according to the invention, the second carrier layer (206) was peeled, and the peeled area was completely folded over onto the first carrier layer (205) to create a seam. Therefore, the second carrier layer (206) both in the first wall region (103) and in the second wall region (104) is thinner than the first carrier layer (205). Therefore, the first wall region (103) and the second wall region (104) are identical. In a longitudinal seam according to example 1, there is no third wall region (301), in which the first wall layer (201), which contains the first carrier layer (205), is connected directly to the third wall layer (203), which contains the third carrier layer (209). The seam geometry of example 1 is demonstrated in FIG. 9 in a container precursor.

In example 2 according to the invention, the carrier material was peeled in a peripheral area of the laminate and the peeled area was folded so that it could be completely folded over on itself. In this way, a peeled first carrier layer (205) was obtained, which was directly overlaid by a peeled second carrier layer (206) in a first wall region (103) and in a second wall region (104). In a longitudinal seam according to example 2, there is no third wall region (301), in which the first wall layer (201), which contains the first carrier layer (205), is connected directly to the third wall layer (203), which contains the third carrier layer (209). The seam geometry of example 2 is demonstrated in FIG. 10 in a container precursor.

Example 3 according to the invention was generated in the same way as example 2, but the peeled second carrier layer (206) was folded over across the peeled area of the first carrier layer (205) as far as the unpeeled area of the first carrier layer (205). This results in a first wall region (103), in which a peeled second carrier layer (206) and an unpeeled third carrier layer (209) follow an unpeeled first carrier layer (205). In the second wall region (104), according to example 3, a peeled second carrier layer (206) and an unpeeled third carrier layer (209) follow a peeled first carrier layer (205). In a longitudinal seam according to example 3, there is no third wall region (301), in which the first wall layer (201), which contains the first carrier layer (205), is connected directly to the third wall layer (203), which contains the third carrier layer (209). The seam geometry of example 3 is demonstrated in FIG. 2 in a container precursor.

Example 4 according to the invention is like example 3, but here the third wall layer (203) extends beyond the second wall layer (202) as far as the first wall layer (201). Therefore, there is a third wall region (301), in which the first wall layer (201), which contains the first carrier layer (205), is connected directly to the third wall layer (203), which contains the third carrier layer (209), in the longitudinal seam according to example 4. The seam geometry of example 4 is demonstrated in FIG. 3 in a container precursor.

The containers according to the above examples (according to the invention) and the comparative examples (not according to the invention) were examined as regards their stability according to the abovementioned compression. Further, the defective container precursors produced as well as the average process speed during the manufacturing process were determined.

TABLE 2

Container failure based on maximum breaking load (according to DIN EN ISO 12048), percentage of defective container precursors as well as average process speed

|  | Maximum breaking load [N] | Percentage of defective container precursors [%] | Average process speed [m/min] |
| --- | --- | --- | --- |
| Comparative example 1 | 135 | 38 | 250 |
| Comparative example 2 | 147 | 14 | 270 |
| Example 1 | 175 | 9 | 410 |
| Example 2 | 193 | 0 | 500 |
| Example 3 | 220 | 0 | 550 |
| Example 4 | 231 | 0 | 580 |

As shown in Table 2, the containers manufactured in accordance with the examples according to the invention are more stable than the containers of the comparative examples. The containers of examples 2 to 4 turned out to be particularly advantageous. In addition, more defective container precursors are produced in the manufacturing process of the containers of the comparative examples. In the manufacture of the containers according to examples 3 and 4, the percentage of defective container precursors is 0%. Further, it is clear from Table 2 that containers manufactured in accordance with the examples according to the invention can be produced more quickly. The average process speed is highest for examples 3 and 4. Overall, the results for example 4 are the most advantageous.

In the drawings:

FIG. 1a) shows a schematic representation of a shell-shaped container precursor according to the invention;

FIG. 1b) shows a schematic representation of a tubular container precursor according to the invention;

Figure 5:
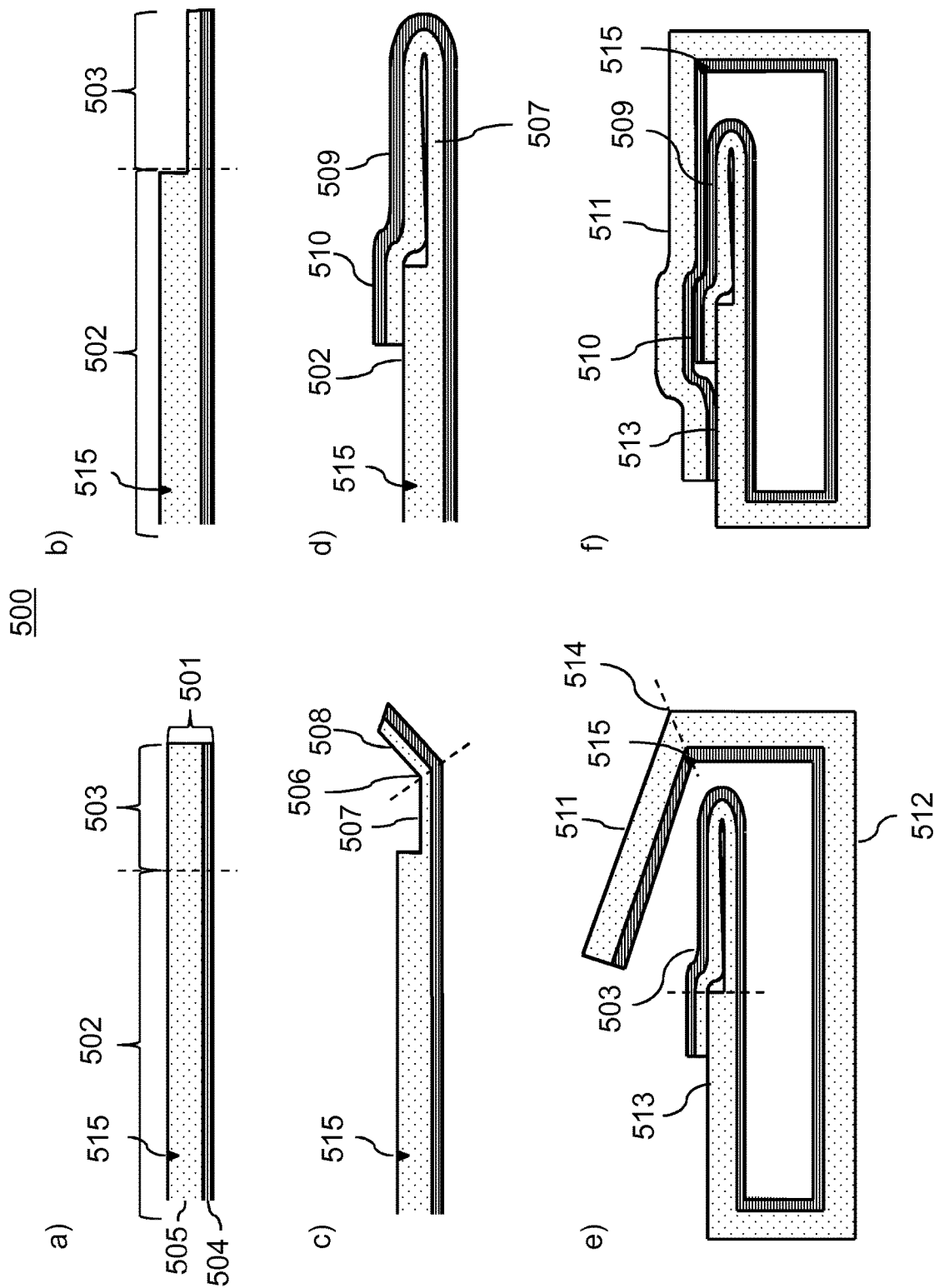
Figure 6:
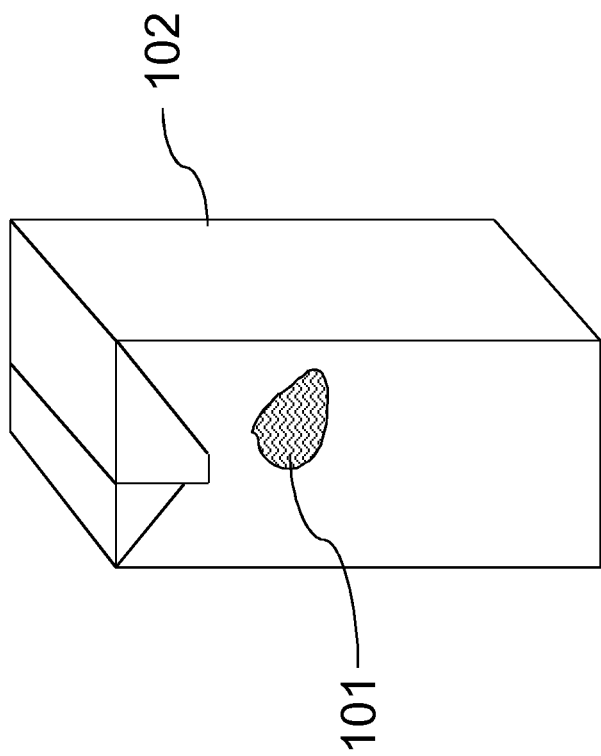
Figure 7:
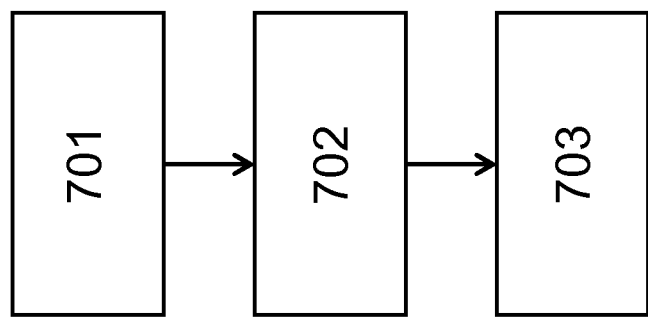
Figure 8:
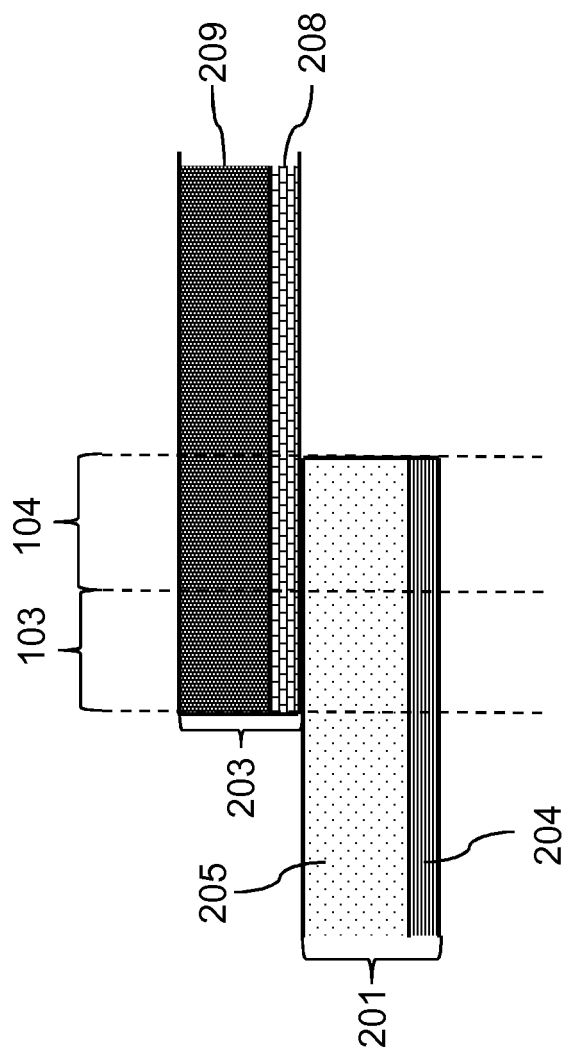
Figure 9:
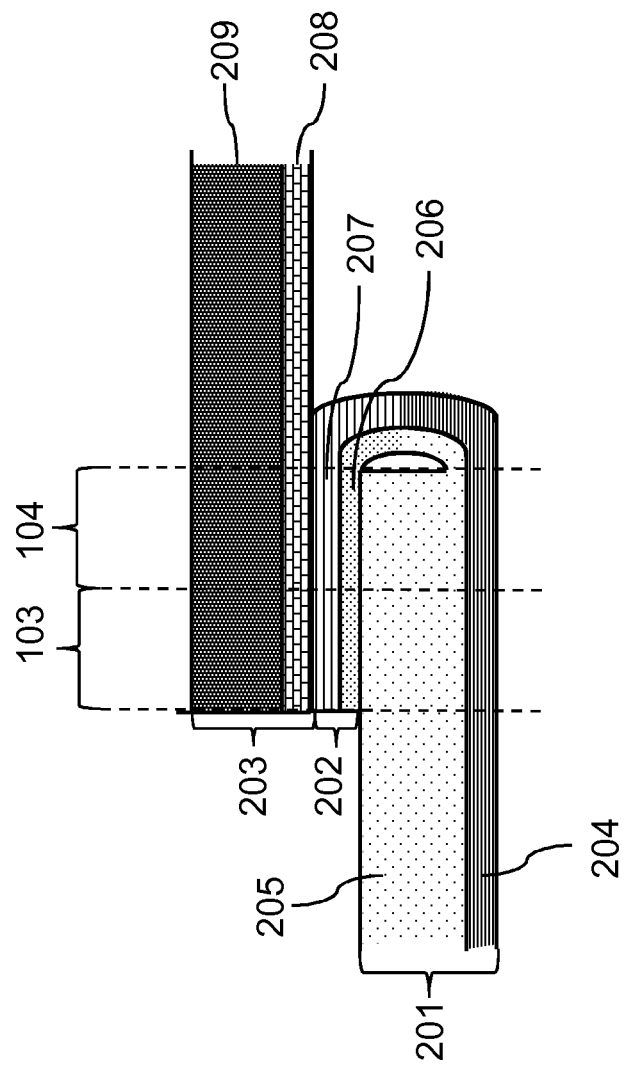
Figure 10:
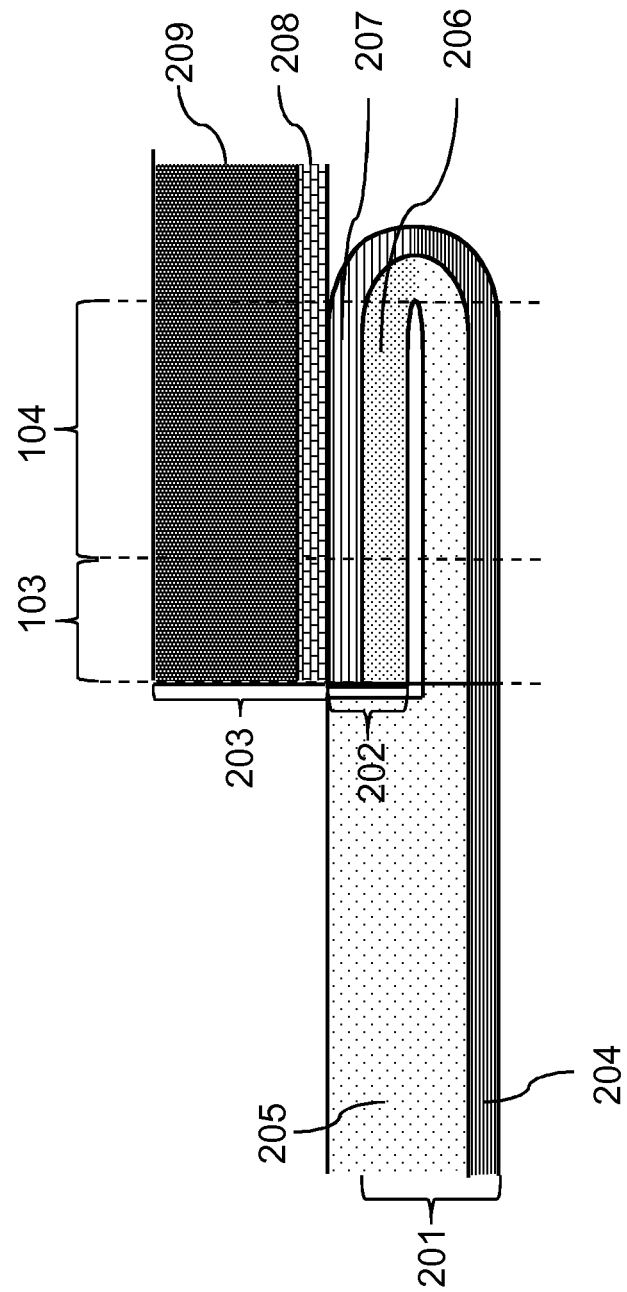

FIG. 5a) shows a schematic illustration of a process step a) of a process according to the invention for manufacturing a container precursor;

FIG. 5b) shows a schematic illustration of a process step b) of a process according to the invention for manufacturing a container precursor;

FIG. 5c) shows a schematic illustration of a process step c) of a process according to the invention for manufacturing a container precursor;

FIG. 5d) shows a schematic illustration of a process step d) of a process according to the invention for manufacturing a container precursor;

FIG. 5e) shows a schematic illustration of a process step e) of a process according to the invention for manufacturing a container precursor;

FIG. 5f) shows a schematic illustration of a process step f) of a process according to the invention for manufacturing a container precursor;

FIG. 6 shows a schematic representation of a closed container according to the invention;

FIG. 7 shows a flowchart of a process according to the invention for the manufacture of a closed container;

FIG. 8 shows a schematic cross section of a section of a wall of a container precursor that is not according to the invention;

FIG. 9 shows a schematic cross section of a section of a wall of a further container precursor that is not according to the invention;

FIG. 10 shows a schematic cross section of a section of a wall of a container precursor that is not according to the invention; and FIG. 11 shows a schematic cross section of a section of a wall of a further container precursor that is not according to the invention.

Figure 1:
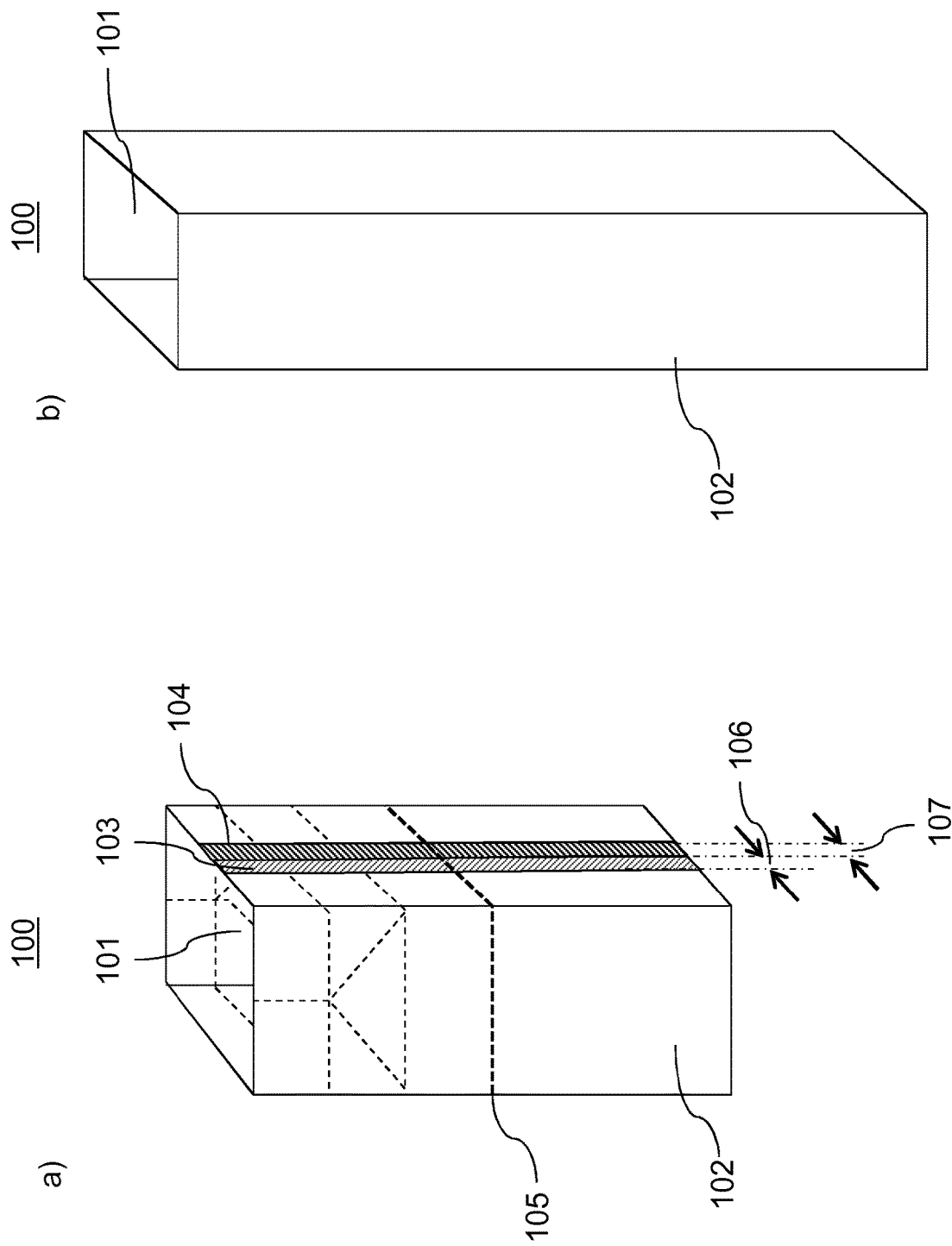

FIG. 1a) shows a schematic representation of a shell-shaped container precursor according to the invention 100. The container precursor 100 comprises a wall 102, which consists of a sheet-like composite in one piece. The container precursor surrounds an interior region 101. An outer surface of the sheet-like composite forms a geometrical outer surface of a cube. A circumference 105 of this outer surface and hence of the container precursor is indicated by a thick dashed line. The container precursor is formed from the sheet-like composite by folding at at least 4 folding locations. The end edges of the sheet-like composite are bonded together via sealing. This seal forms a longitudinal seam in the container precursor. The longitudinal seam comprises a first wall region 103 and a second wall region 104. The first wall region 103 has a width 106 of 3 mm along the circumference 105. The second wall region 104 has a width 107 of 5 mm along the circumference 105. Thin dashed lines in FIG. 1a) represent creases in the sheet-like composite. A head portion of a container precursor or container may be formed by folding along the creases and by joining certain fold surfaces.

FIG. 1b) shows a schematic representation of a tubular container precursor according to the invention 100. The container precursor 100 comprises a wall 102, which consists of a sheet-like composite in one piece. The container precursor surrounds an interior region 101. The container precursor 100 is a semi-endless tube structure with an opening at opposite ends of the tube. In FIG. 1b) the length of the tube is presented in shortened form.

Figure 2:
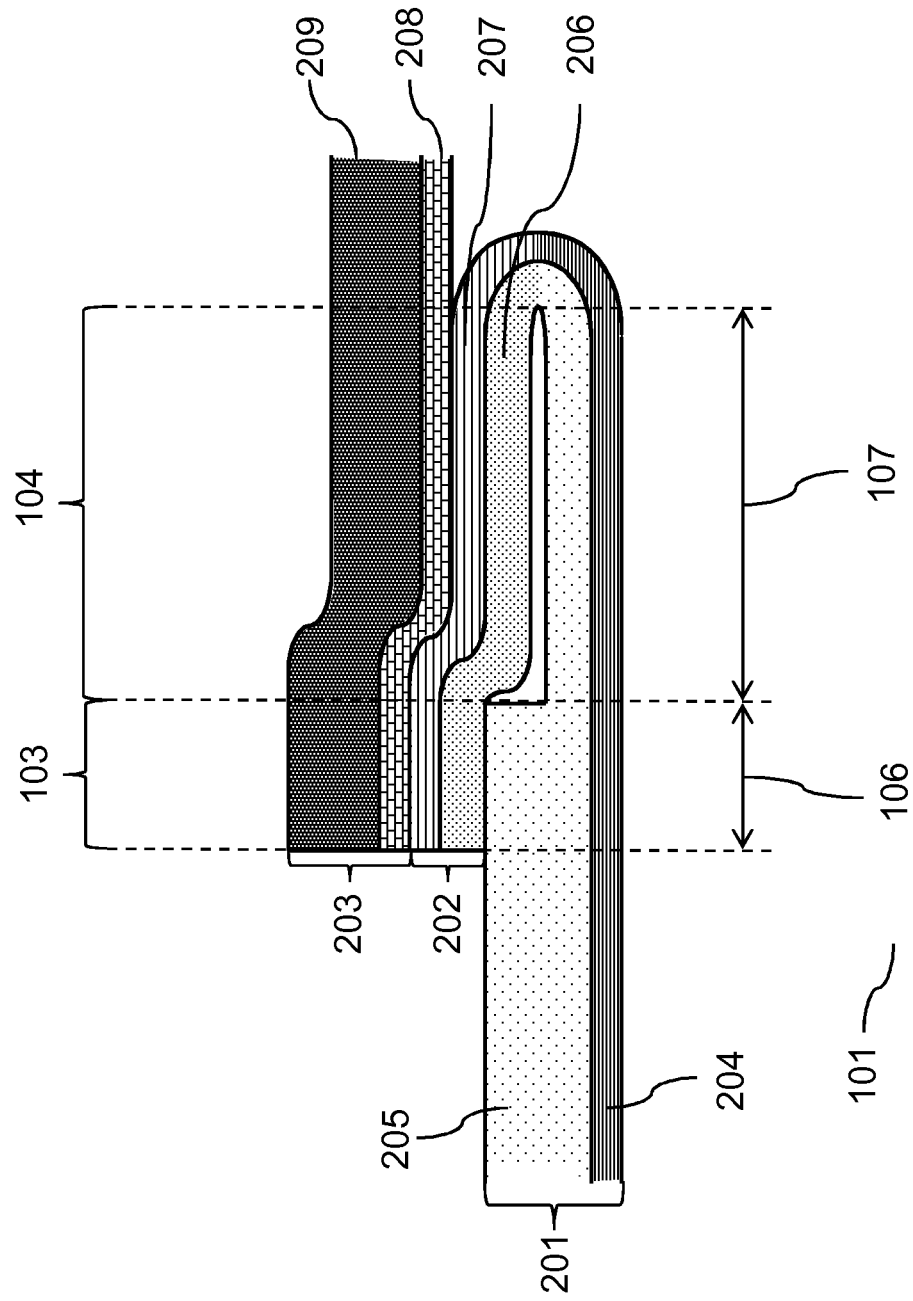
FIG. 2 shows a schematic cross section of a section of a wall of a container precursor according to the invention.

FIG. 2 shows a schematic cross section of a section of a wall 102 of a container precursor according to the invention 100. The wall 102 is the wall 102 of the container precursor 100 in FIG. 1a). In FIG. 2 the interior region 101 below the wall 102 and hence in the container precursor 100 is presented. The cross section of FIG. 2 is a cross section through the longitudinal seam of the container precursor 100. The wall 102 comprises a first wall region 103 and a second wall region 104. The first wall region 103 and the second wall region 104 abut against each other. The first wall region 103 comprises a first layer sequence, which comprises, as layers superimposed on each other from the interior region 101 outwards, a first wall layer 201, a second wall layer 202 and a third wall layer 203. Each of these three wall layers 201, 202, 203 belongs to the sheet-like composite. The first wall layer 201 merges into the second wall layer 202 at the fold position shown in FIG. 2. In the first wall region 103 and in the second wall region 104, however, the three wall layers 201, 202, 203 do not merge into one another but, as described above, form a layer sequence in each wall region 103, 104. Further, in the first wall region 103, the first wall layer 201 is connected to the second wall layer 202. Here, the second wall layer 202 is sealed onto the first wall layer 201. Further, in the first wall region 103, the second wall layer 202 and the third wall layer 203 are connected to each other by means of a sealing connection. The first wall layer 201 comprises, as first wall layer sequence from the interior region 101 outwards, a first barrier layer 204 and a first carrier layer 205. The first barrier layer 204 is an aluminium layer. The first carrier layer 205 is a cardboard layer. There is a polyethylene layer (not shown) between the first barrier layer 204 and the first carrier layer 205. The second wall layer 202 comprises, as second wall layer sequence from the interior region 101 outwards, a second carrier layer 206 and a second barrier layer 207. The second barrier layer 207 is an aluminium layer. The second carrier layer 206 is a cardboard layer. There is a polyethylene layer (not shown) between the second barrier layer 204 and the second carrier layer 206. The third wall layer 203 comprises, as third wall layer sequence from the interior region 101 outwards, a third barrier layer 208 and a third carrier layer 209. The third barrier layer 208 is an aluminium layer. The third carrier layer 209 is a cardboard layer. There is a polyethylene layer (not shown) between the third barrier layer 208 and the third carrier layer 209. In the first wall region 103 the second carrier layer 206 is a characterised by a smaller layer thickness than the first carrier layer 205 and the third carrier layer 209. The layer thickness of the second carrier layer 206 is 65% of the layer thickness of the first carrier layer 205 and of the third carrier layer 209. The first carrier layer 205 and the third carrier layer 209 have the same layer thickness in the first wall region 103. The second wall region 104 comprises a second layer sequence with, as overlying layers seen from the interior region 101 outwards, the above described first wall layer 201, the second wall layer 202 and the third wall layer 203. In the second wall region 104 the second wall layer 202 and the third wall layer 203 are sealed one on top of the other. In the second wall region 104, the first wall layer 201 and the second wall layer 202 are neither connected together nor in contact with each other. Between these two layers there is a cavity and no further layer of the sheet-like composite. Further, in the second wall region 104, the third carrier layer 209 is thicker than the second carrier layer 206 and thicker than the first carrier layer 205. In the second wall region 104, the layer thickness of the first carrier layer 205 and of the second carrier layer 206 is 65% of the layer thickness of the third carrier layer 209. In the first wall region 103, the second carrier layer 206 is peeled, but the first carrier layer 205 is not. In the second wall region 104, the first carrier layer 205 and the second carrier layer 206 are peeled. All barrier layers 204, 207, 208 shown in FIG. 2 consist of aluminium EN A W 8079 from Hydro Aluminium Deutschland GmbH. These layers 204, 207, 208 each have a layer thickness of 6 µm and are designed in one piece with one another. These barrier layers 204, 207, 208 belong to the sheet-like composite and merge into one another at folds. For the first barrier layer 204 and the second barrier layer 207, this is shown with the fold in FIG. 2. Also, carrier layers 205, 206, 209 shown in FIG. 2 are designed in one piece with one another. The carrier layers 205, 206, 209 belong to the sheet-like composite and merge into one another at folds. For the first carrier layer 205 and the second carrier layer 206, this is shown with the fold in FIG. 2. Further folds of the sheet-like composite are not shown in FIG. 2 but can be derived from FIG. 1a). To manufacture the wall 102 in FIG. 2, a carrier material (Stora Enso Natura T Duplex Doppelstrich from Stora Enso Oyj AG, Scott Bond value of 200 J/m², residual humidity 7.5%) with a "coating" on both carrier sides was used. Thus, both layer surfaces of each carrier layer 205, 206, 209 in FIG. 2 substantially compose a "coating". However, peeled layer surfaces do not comprise a "coating". Therefore, the layer surface of the first carrier layer 205 facing the second carrier layer 206 in the second wall region 104 does not comprise a "coating". In the first wall region 103, the layer surface of the first carrier layer 205 facing the second carrier layer 206 comprises a "coating". In the first wall region 103 as in the second wall region 104, the layer surface of the second carrier layer 206 facing the first carrier layer 205 does not comprise a "coating". All the aforementioned polyethylene layers consist of LDPE 19N430 from Ineos Köln GmbH. Along the circumference 105 (see FIG. 1a)) the first wall region 103 has a first width 106 of 3 mm. The second wall region 104 has a second width 107 of 5 mm along the circumference 105.

Figure 3:
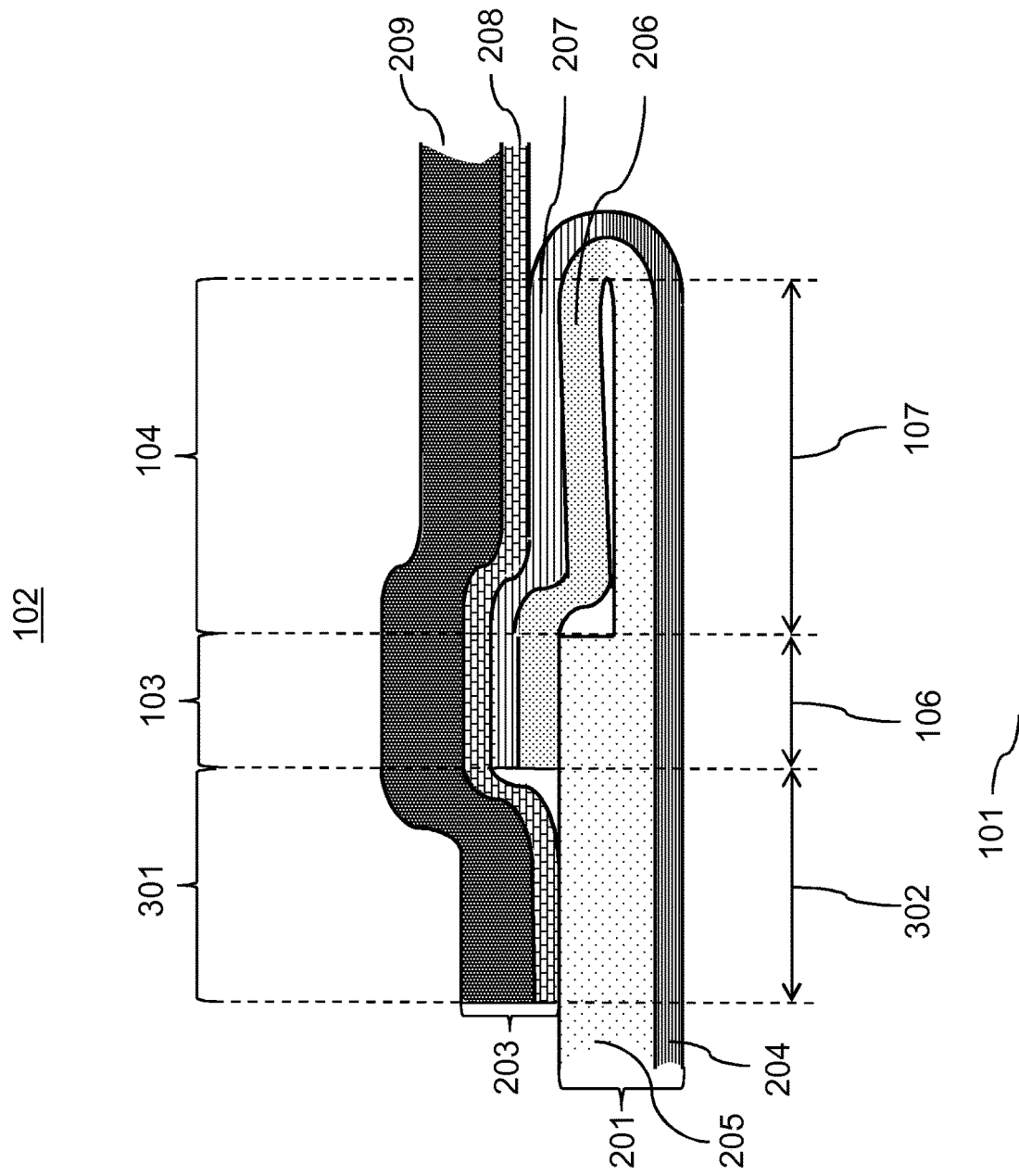
FIG. 3 shows a schematic cross section of a section of a wall of a further container precursor according to the invention.

FIG. 3 shows a schematic cross section of a section of a wall 102 of a further container precursor according to the invention 100. The wall 102 is the wall 102 in FIG. 2, irrespective of the fact that the wall 102 in FIG. 3 additionally comprises a third wall region 301. The third wall region 301 comprises a third layer sequence, comprising, as overlying layers seen from the interior region 101 outwards, the first wall layer 201 and the third wall layer 203. The second wall layer 202 is not included in the third wall region 301. In the third wall region 301, the first wall layer 201 and the third wall layer 203 are sealed one on top of the other. The third wall region 301 abuts against the first wall region 103. Along the circumference 105 (see FIG. 1a)) the third wall 301 has a third width 302 of 5 mm. Further, in the second wall 104 the first wall layer 201 and the second wall layer 202 are not connected together, but are partially in contact with each other. In particular, the first carrier layer 205 and the second carrier layer 206 in the second wall region are not connected together, but are partially in contact with each other.

Figure 4:
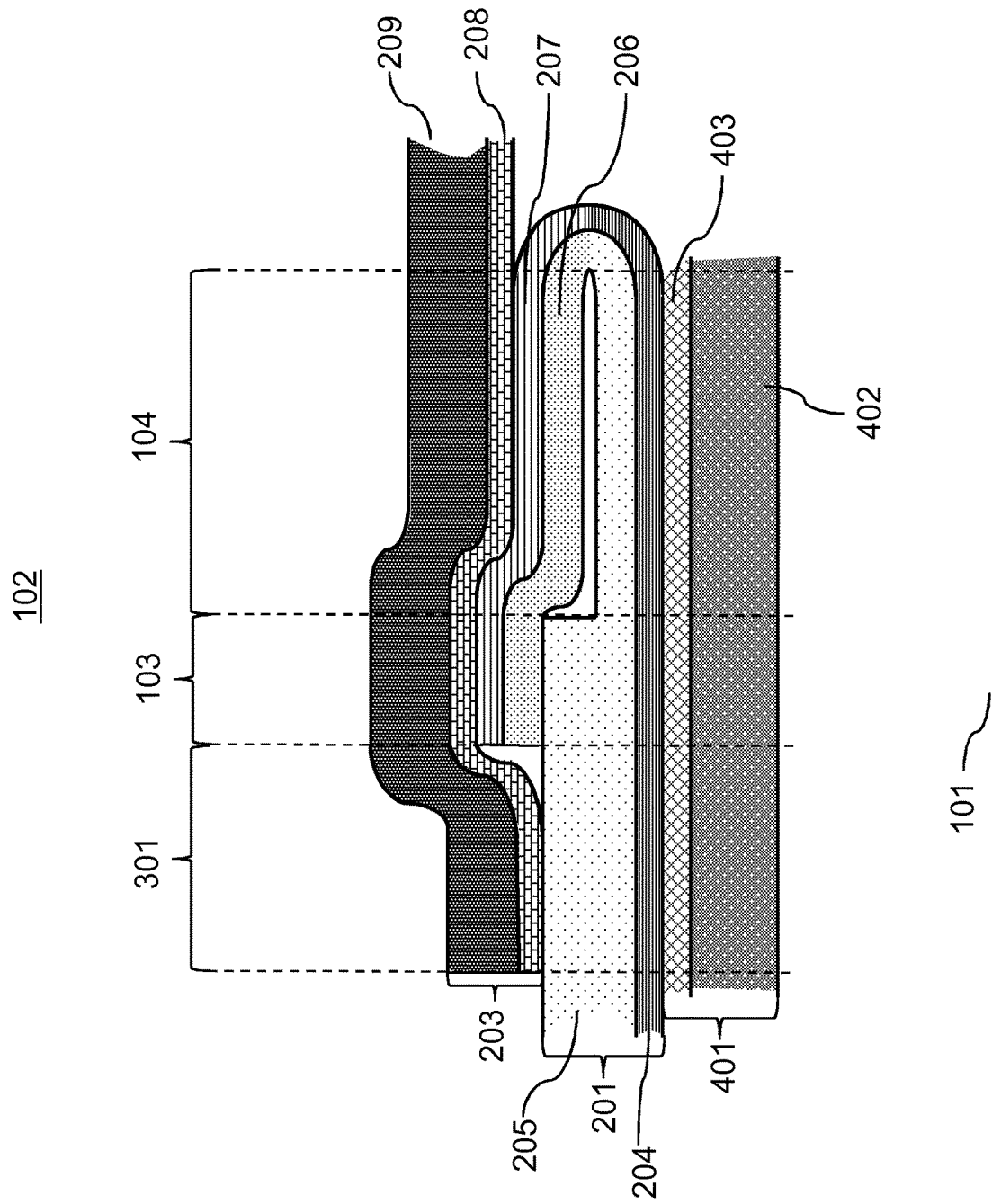
FIG. 4 shows a schematic cross section of a section of a wall in a head portion of a closed container according to the invention.

FIG. 4 shows a schematic cross section of a section of a wall 102 in a head portion of a closed container according to the invention 600. The container 600 was manufactured out of the container precursor in FIG. 1a), the head portion of the container 600 being obtained through folds along the creases and seals of specific fold surfaces shown in FIG. 1a). An external view of the closed container 600 is shown in FIG. 6. The wall 102 is the wall 102 in FIG. 3, FIG. 4 showing a different section of the wall 102. The section of the wall 102 shown in FIG. 4 lies in the head portion of the container 600. In this section, a further layer of the sheet-like composite is sealed on a side of the longitudinal seam facing the interior region 101. Further, as shown in FIG. 6, the longitudinal seam is folded over onto the head of the container. Therefore, the interior region 101 in FIG. 4 is in the lower part of the Figure. Without this folding over, in FIG. 4 there would be an outer space in relation to the closed container 600 both above and below the shown connection. Thus, a fourth wall 401 is superimposed on the first wall layer 201 on a side facing the interior region 101 in the first wall region 103, the second wall region 104 and the third wall region 301. The fourth wall layer 401, as a fourth wall layer sequence seen from the interior region 101 outwards, comprises a fourth carrier layer 402 and a fourth barrier layer 403. The fourth barrier layer 403 is an aluminium layer (aluminium EN A W 8079 from Hydro Aluminium Deutschland GmbH). The fourth carrier layer 402 is a cardboard layer (Stora Enso Natura T Duplex Doppelstrich from Stora Enso Oyj AG, Scott Bond value of 200 J/m², residual humidity 7.5%). There is a polyethylene layer (not shown, LDPE 19N430 von der Ineos Köln GmbH) between the fourth barrier layer 403 and the fourth carrier layer 402. The fourth wall layer 401 also belongs to the sheet-like composite. The fourth barrier layer 403 is formed as one piece with the first barrier layer 204, the second barrier layer 207 and the third barrier layer 208. All these barrier 204, 207, 208, 403 belong to the sheet-like composite and merge into each other at folds. The fourth carrier layer 402 is formed as one piece with the first carrier layer 205, the second carrier layer 206 and the third carrier layer 209. All these carrier layers 205, 206, 209, 402 belong to the sheet-like composite and merge into each other at folds. The fourth carrier layer 402 has, in the first wall region 103, the second wall region 104 and the third wall region 301 the same layer thickness as the third carrier layer 209. Therefore, in the first wall region 103, the second carrier layer 206 has a smaller layer thickness than the fourth carrier layer 402 and, in the second wall region 104, the fourth carrier layer 402 has a larger layer thickness than the second carrier layer 206 and the first carrier layer 205.

FIG. 5a) shows a schematic illustration of a process step a) of a process according to the invention 500 for the manufacture of a container precursor 100. In process step a) a sheet-like composite is provided. The sheet-like composite comprises a composite layer sequence 501. The composite layer sequence 501 comprises, as overlying composite layers, a composite carrier layer 505 and a composite barrier layer 504. The composite barrier layer 504 is an aluminium layer (aluminium EN A W 8079 from Hydro Aluminium Deutschland GmbH). The composite carrier layer 505 is a cardboard layer (Stora Enso Natura T Duplex Doppelstrich from Stora Enso Oyj AG, Scott Bond value of 200 J/m², residual humidity 7.5%). There is a polyethylene layer (not shown, LDPE 19N430 von der Ineos Köln GmbH) composite carrier layer 505 and the barrier layer 504. The sheet-like composite can be split into an edge region 503 and an inner region 502. The end area 503 abuts against the inner region 502 at the dashed line in FIG. 5a). In the inner region 502, the sheet-like composite comprises a crease 515.

FIG. 5b) shows a schematic illustration of a process step b) of a process according to the invention 500 for the manufacture of a container precursor 100. The process 500 is the same process 500 as in FIG. 5a). The process step b) consists in reducing the layer thickness of the composite carrier layer 505 in the edge region 503. Reduction involves peeling the composite carrier layer 505 with a rotating pot knife. This is done with a peeling mechanism Model VN 50 from Fortuna Spezialmaschinen GmbH, Weil der Stadt, Germany. In this way, the layer thickness of the composite carrier layer is reduced by 25% of the original layer thickness.

FIG. 5c) shows a schematic illustration of a process step c) of a process according to the invention 500 for the manufacture of a container precursor 100. The process 500 is the same process 500 as in FIG. 5a). In process step c), a fold 506 is created in the end area 503, and so a first edge fold region 507 and a further edge fold region 508 are obtained. The first edge fold region 507 and the further edge fold region 508 abut against each other along the fold 506.

FIG. 5d) shows a schematic illustration of a process step d) of a process according to the invention 500 for the manufacture of a container precursor 100. The process 500 is the same process 500 as in FIG. 5a). The process step d) consists in bringing the first edge fold region 507 into contact with a first part 509 of the further edge fold region 508, and connecting a further part 510 of the further edge fold region 508 to the inner region 502.

FIG. 5e) shows a schematic illustration of a process step e) of a process according to the invention 500 for the manufacture of a container precursor 100. The process 500 is the same process 500 as in FIG. 5a). The process step e) consists in creating a further fold 514 along the crease 515 in the inner region 502 to obtain a first composite fold region 511 and a further composite fold region 512. The further composite fold region 512 comprises a part 513 of the inner region 502.

FIG. 5f) shows a schematic illustration of a process step f) of a process according to the invention 500 for the manufacture of a container precursor 100. The process 500 is the same process 500 as in FIG. 5a). The process step f) consists in connecting the first composite fold 511 to the first part 509 of the further edge fold region 508 and the further part 510 of the further edge fold region 508 and the part 513 of the inner region 502. Connection is carried out through sealing. Sealing is carried out through bringing into contact, heating up to sealing temperature and pressing. Heating is carried out through blowing with hot air. Thus, in the process 500, the container precursor 100 is manufactured through folding the sheet-like composite and creating a longitudinal seam.

FIG. 6 shows a schematic representation of a closed container according to the invention 600. The closed container 600 is obtained through folding the container precursor 100 in FIG. 1a) and closing the folded container precursor 100 through sealing with ultrasound. Sealing is carried out using an ultrasound-transmitting sonotrode and an anvil fixing the area to be sealed.

FIG. 7 shows a flowchart of a process according to the invention 700 for the manufacture of a closed container 100 [sic]. The closed container 600 in FIG. 6 may be manufactured through the process 700. The process 700 comprises a process step a) 701: Provision of the container precursor 100 in FIG. 1a). In a process step b) 702, the container precursor 100 is folded. In this way, a head portion and a bottom portion are formed. The head portion may, in particular, be formed through folding along the creases shown in FIG. 1a). In a process step c) 703, the head portion and the bottom portion of the folded precursor 100 are closed through sealing with ultrasound. Sealing is carried out using an ultrasound-transmitting sonotrode made of a titanium alloy and an anvil fixing the area to be sealed. Alternatively, the floor portion can also be sealed using hot air.

FIG. 8 shows a schematic cross section of a section of a wall of a container precursor that is not according to the invention. The figure shows a geometry of a longitudinal seam 800 of the container precursor in cross section. The structure corresponds to comparative example 1.

FIG. 9 shows a schematic cross section of a section of a wall of a container precursor. The figure shows a geometry of a longitudinal seam 900 of the container precursor in cross section. The structure corresponds to example 1.

FIG. 10 shows a schematic cross section of a section of a wall of a container precursor. The figure shows a geometry of a longitudinal seam 1000 of the container precursor in cross section. The structure corresponds to example 2.

FIG. 11 shows a schematic cross section of a section of a wall of a further container precursor that is not according to the invention. The figure shows a geometry of a longitudinal seam 1100 of the container precursor in cross section. The structure corresponds to comparative example 2.

LIST OF REFERENCE NUMBERS

100 container precursor according to the invention
101 interior region
102 wall
103 first wall region
104 second wall region
105 circumference
106 first width
107 second width
201 first wall layer
202 second wall layer
203 third wall layer
204 first barrier layer
205 first carrier layer
206 second carrier layer
207 second barrier layer
208 third barrier layer
209 third carrier layer
301 third wall region
302 third width
401 fourth wall layer
402 fourth carrier layer
403 fourth barrier layer
500 process according to the invention for the manufacture of a container precursor
501 composite layer sequence
502 inner region
503 edge region
504 composite barrier layer
505 composite carrier layer
506 Fold
507 first edge fold region
508 further edge fold region
509 first part of the further edge fold region
510 further part of the further edge fold region
511 first composite fold region
512 further composite fold region
513 part of the inner region
514 further fold
515 Crease
600 closed container according to the invention
700 process according to the invention for the manufacture of a closed container
701 process step a)
702 process step b)
703 process step c)
800 longitudinal seam according to comparative example 1
900 longitudinal seam according to example 1
1000 longitudinal seam according to example 2
1100 longitudinal seam according to comparative example 2

The invention claimed is:

1. A container precursor, comprising a wall, wherein the wall
   a) surrounds an interior region and
   b) comprises a first wall region and a second wall region;
   wherein the first wall region comprises a first layer sequence, comprising, as overlying layers laid on top of one another from the interior region outwards, a first wall layer, a second wall layer and a third wall layer;
   wherein, in the first wall region the first wall layer is connected to the second wall layer and the second wall layer is connected to the third wall layer;
   wherein the first wall layer, as first wall layer sequence from the interior region outwards, comprises a first barrier layer, comprising aluminum, and a first carrier layer;
   wherein the second wall layer, as second wall layer sequence from the interior region outwards, comprises a second carrier layer and a second barrier layer, comprising aluminum;
   wherein the third wall layer, as third wall layer sequence from the interior region outwards, comprises a third barrier layer, comprising aluminum, and a third carrier layer;
   wherein, in the first wall region, the second carrier layer is characterized by a smaller layer thickness than the first carrier layer, or the third carrier layer, or both;
   wherein the second wall region comprises a second layer sequence, comprising, as overlying layers from the interior region outwards, the first wall layer, the second wall layer, and the third wall layer;
   wherein, in the second wall region, the second wall layer is connected to the third wall layer;
   wherein, in the second wall region, the third carrier layer is characterized by a larger layer thickness than the second carrier layer, or the first carrier layer, or both.

2. The container precursor according to claim 1, wherein the first wall region abuts against the second wall region.

3. The container precursor according to claim 1, wherein the first wall region is characterized by a first width along a circumference of the container precursor,
   wherein the first width is in a range from 1 to 6 mm.

4. The container precursor according to claim 1, wherein the second wall region is characterized by a second width along the circumference of the container precursor, wherein the second width is in a range from 1 to 10 mm.

5. The container precursor according to claim 1, wherein, in the first wall region, the layer thickness of the second carrier layer is 0.05 to 0.9 times the layer thickness of the first carrier layer, or the third carrier layer, or both.

6. The container precursor according to claim 1, wherein, in the second wall region, the layer thickness of the third carrier layer is 1.1 to 20 times the layer thickness of the first carrier layer, or the second carrier layer, or both.

7. The container precursor according to claim 1, wherein, in the second wall region, the first wall layer is not connected to the second wall layer.

8. The container precursor according to claim 1, wherein, in the second wall region
   a) a surface of the first carrier layer facing the second carrier layer, and
   b) a surface of the second carrier layer facing the first carrier layer,
   do not comprise a cover layer and are not connected to a cover layer.

9. The container precursor according to claim 1, wherein, in the first wall region, a surface of the second carrier layer facing the first carrier layer does not comprise a cover layer and is not connected to a cover layer.

10. The container precursor according to claim 1, wherein one selected from the group consisting of the first carrier layer, the second carrier layer, and the third carrier layer, or a combination of at least two thereof, comprises one selected from the group consisting of cardboard, paperboard, paper, and a combination of at least two thereof.

11. The container precursor according to claim 1, wherein the wall comprises a third wall region; wherein the third wall region comprises a third layer sequence, comprising, as overlying layers from the interior region outwards, the first wall layer and the third wall layer;
   wherein, in the third wall region, the first wall layer is connected to the third wall layer;
   wherein the third wall region abuts against the first wall region.

12. The container precursor according to claim 11, wherein the third wall region is characterized by a third width along the circumference of the container precursor, wherein the third width is in a range from 1 to 12 mm.

13. A closed container obtained by folding the container precursor according to claim 1 and closing the folded container precursor with a closing tool.

14. The closed container according to claim 13, wherein the wall surrounds the interior region on all sides,
   wherein the wall consists of a one-piece sheet composite.

15. The closed container according to claim 13, wherein one selected from the group consisting of the first layer sequence, the second layer sequence, and the third layer sequence, or a combination of at least two thereof, comprises a further carrier layer.

16. The closed container according to claim 13, wherein, in the first wall region and the second wall region, the first wall layer is overlaid by a fourth wall layer on a side facing the interior region;
   wherein the fourth wall layer, as fourth wall layer sequence from the interior region outwards, comprises a fourth carrier layer and a fourth barrier layer, comprising aluminum;
   wherein, in the first wall region, the second carrier layer is characterized by a smaller layer thickness than the fourth carrier layer;
   wherein, in the second wall region, the fourth carrier layer is characterized by a larger layer thickness than the second carrier layer, or the first carrier layer, or both.

17. The closed container according to claim 16, wherein, further in the third wall region the fourth wall layer overlays the first wall layer on a side facing the interior region.

18. A process comprising the following process steps
   a) provision of the container precursor according to claim 1;
   b) folding the container precursor; and
   c) closing the container precursor with a closing tool to obtain a closed container.

19. The process according to claim 18, wherein, prior to process step c), a foodstuff is introduced into the container precursor.

20. The process according to claim 18, wherein, after process step c), the closed container is autoclaved.

21. The process according to claim 18, wherein, prior to process step c), the container precursor is sterilized.

22. A use of the container precursor according to claim 1 to produce a closed container.

23. A use of the container precursor according to claim 1 for filling with a foodstuff.

* * * * *